(12) United States Patent
Walsh et al.

(10) Patent No.: US 12,478,949 B2
(45) Date of Patent: Nov. 25, 2025

(54) COMPOSITE PARTICLES WITH NON-POROUS HYBRID ORGANIC-INORGANIC MATERIAL

(71) Applicant: Waters Technologies Corporation, Milford, MA (US)

(72) Inventors: Daniel P. Walsh, Danvers, MA (US); Mingcheng Xu, Lexington, MA (US); Nicole L. Lawrence, Stafford Springs, CT (US)

(73) Assignee: Waters Technologies Corporation, Milford, MA (US)

( * ) Notice: Subject to any disclaimer, the term of this patent is extended or adjusted under 35 U.S.C. 154(b) by 464 days.

(21) Appl. No.: 18/174,297

(22) Filed: Feb. 24, 2023

(65) Prior Publication Data

US 2024/0082814 A1    Mar. 14, 2024

Related U.S. Application Data

(60) Provisional application No. 63/401,555, filed on Aug. 26, 2022.

(51) Int. Cl.
*B01J 20/22* (2006.01)
*B01J 20/10* (2006.01)
(Continued)

(52) U.S. Cl.
CPC .......... *B01J 20/223* (2013.01); *B01J 20/103* (2013.01); *B01J 20/262* (2013.01);
(Continued)

(58) Field of Classification Search
CPC ...... B01J 20/103; B01J 20/223; B01J 20/262; B01J 20/28016; B01J 20/2803;
(Continued)

(56) References Cited

U.S. PATENT DOCUMENTS

| 4,017,528 | A | 4/1977 | Unger et al. |
| 6,528,167 | B2 | 3/2003 | O'Gara |

(Continued)

FOREIGN PATENT DOCUMENTS

| WO | 2007038801 A2 | 4/2007 |
| WO | 2012018596 A2 | 2/2012 |

(Continued)

OTHER PUBLICATIONS

International Search Report and Written Opinion issued in International Application No. PCT/IB2023/051751 dated Jul. 3, 2023.
(Continued)

*Primary Examiner* — Brian A McCaig
(74) *Attorney, Agent, or Firm* — WOMBLE BOND DICKINSON (US) LLP; Deborah M. Vernon; Moses J. Amtry

(57) ABSTRACT

The present disclosure pertains to composite particles with polymer-based cores, which eliminate the high pH failure mechanism of silica-based core-shell silica particles. In various embodiments, a non-porous polymer core is surface modified. In various embodiments, a non-porous hybrid organic-inorganic material is in contact with the modified surface of the core, and a porous inorganic material is in contact with the non-porous hybrid organic-inorganic material. The present disclosure pertains to chromatographic separation devices that comprise such composite particles.

20 Claims, 3 Drawing Sheets

(51) Int. Cl.
 *B01J 20/26* (2006.01)
 *B01J 20/28* (2006.01)
 *B01J 20/32* (2006.01)

(52) U.S. Cl.
 CPC ..... *B01J 20/2803* (2013.01); *B01J 20/28071* (2013.01); *B01J 20/3246* (2013.01); *B01J 20/3265* (2013.01); *B01J 2220/46* (2013.01)

(58) Field of Classification Search
 CPC .............. B01J 20/28071; B01J 20/3242; B01J 20/3246; B01J 20/3265; B01J 20/3289; B01J 20/3293; B01J 2220/46
 See application file for complete search history.

(56) References Cited

U.S. PATENT DOCUMENTS

| | | | |
|---|---|---|---|
| 6,686,035 | B2 | 2/2004 | Jiang et al. |
| 7,175,913 | B2 | 2/2007 | O'Gara |
| 7,919,177 | B2 | 4/2011 | Jiang et al. |
| 10,507,408 | B2 | 12/2019 | Wei |
| 2016/0184736 | A1 | 6/2016 | Wyndham et al. |
| 2019/0322783 | A1 | 10/2019 | Brousmiche et al. |
| 2020/0384480 | A1 | 12/2020 | Liu et al. |
| 2024/0092959 | A1* | 3/2024 | Lawrence ............. C08F 283/06 |

FOREIGN PATENT DOCUMENTS

| | | |
|---|---|---|
| WO | 2013173647 A1 | 11/2013 |
| WO | 2014201033 A1 | 12/2014 |
| WO | 2017155870 A1 | 9/2017 |
| WO | 2018136666 A1 | 7/2018 |
| WO | 2019168989 A1 | 9/2019 |
| WO | 2022061039 A1 | 3/2022 |
| WO | 2023026258 A1 | 3/2023 |
| WO | 2024042371 A1 | 2/2024 |
| WO | 2024042372 A1 | 2/2024 |
| WO | 2024042373 A1 | 2/2024 |

OTHER PUBLICATIONS

Fekete et al. "Fast liquid chromatography: The domination of core-shell and very fine particles." J. Chromatogr. A. 1228(2012): 57-71.

Hayes et al. "Core-shell particles: Preparation fundamentals and applications in high performance liquid chromatography." J. Chromatogr. A. 1357(2014): 36-52.

Sarma et al. "Polystyrene Core-Silica Shell Particles with Defined Nanoarchitectures as a Versatile Platform for Suspension Array Technology." Langmuir. 32.15(2016): 3717-3727.

Tanaka et al. "Core-shell, ultra-small particles, monoliths and other support materials in high performance liquid chromatography." Anal. Chem. 88.1(2016): 279-298.

* cited by examiner

COMPOSITE PARTICLES WITH NON-POROUS HYBRID ORGANIC-INORGANIC MATERIAL

CROSS-REFERENCE TO RELATED APPLICATIONS

This application claims priority to and the benefit of U.S. Provisional Application Ser. No. 63/401,555, filed Aug. 26, 2022, and entitled "Core-Shell Particles with Non-Porous Hybrid Organic-Inorganic Layer." The foregoing application is incorporated herein by reference in its entirety.

FIELD OF TECHNOLOGY

The present technology is directed to chromatographic materials. More particularly, the present technology is directed to superficially porous composite particles for use in chromatographic separations. In general, the superficially porous composite particles comprise a non-porous polymer core, a non-porous hybrid organic-inorganic material in contact with the core, and a porous inorganic material in contact with the non-porous hybrid organic-inorganic material.

BACKGROUND

Chromatography is a separation process involving two phases, one stationary and the other mobile. Typically, the stationary phase is a porous or non-porous particle that is packed into a column. The mobile phase flows through the packed column. The sample, or analytes, to be separated is injected at the beginning of the column and is transported through the system by the mobile phase. In their travel through the column, the different components of the sample distribute themselves according to their relative affinity for the two phases. The results of the chromatographic separation is then depicted via a chromatogram, where the sample components can be identified by various peaks or patterns of the chromatogram.

Measuring the degree of separation between two components is commonly referred to as the resolution of each component. The resolution can be determined by efficiency, selectivity, and retention of the separation process. Efficiency refers to the quality of separation of the sample components, which is typically determined by the number of peaks that can be separated in the chromatogram. Selectivity refers to the ability of the chromatographic method to separate the components of the sample and is typically measured by a ratio of the retention of two peaks in question of the chromatogram and can be visualized as the distance between the apices of the two peaks. Retention, or retention time, refers to the time required for the sample to pass through the chromatographic column, and is typically measured as the interval of time between the injection of the sample and the detection of its components on the chromatogram.

Adjustment of mobile phase pH is a powerful tool to improve retention and selectivity in chromatographic separation of analytes, especially of ionizable analytes. A high pH mobile phase combined with elevated temperature is typically used to gain extended retention, excellent peak shape and good efficiency in reversed phase chromatographic separation of basic compounds, peptides, and biological samples. Silica-based stationary phases have been preferred in the past, due to its stability at neutral pH and high temperature. However, a common drawback is the instability of silica-based stationary phases at high pH due to particle erosion caused by dissolution, which in turn limits its use in those applications. An alternative to silica based stationary phases is to use a polymer-based stationary material. Polymer-based stationary particles have showed some promise, but also have some limitations in column efficiency, especially in the separation of small molecules.

Superficially porous particles (also known as solid-core or core-shell particles) have become popular as chromatographic stationary phases for their increased efficiency and reduced backpressure as compared to fully porous particles. Superficially porous particles suitable for chromatographic applications contain a silica non-porous core with a porous shell. To date, hybridization techniques on inorganic materials have allowed use under high pH conditions, however these particles continue to show weakness due to the dissolution of the non-porous silica core over time. For example, superficially porous particles with a hybrid organic-inorganic coating and/or densely bonded material improves high pH stability, however with prolonged high pH exposure in a packed column, the particles undergo solid silica core dissolution which leads to column failure. Accordingly, superficially porous particles with a hybrid organic-inorganic coating for use in a stationary phase that have the ability to remain stable at prolonged high pH is desirous.

SUMMARY OF TECHNOLOGY

The present technology is directed to superficially porous composite particles for use in chromatographic separations. In particular, the embodiments of the present technology relate to reducing and/or eliminating silica core dissolution in the composite particles of the present disclosure.

The technology disclosed herein is directed to superficially porous composite particles for use in chromatographic separations (e.g., stationary phase). The superficially porous composite particles of the present technology include a non-porous inner portion, and a porous portion exterior to the non-porous inner portion. In an embodiment, the composite particles include a non-porous polymer core having a modified surface. A non-porous hybrid organic-inorganic material is deposited or formed on the modified surface of the non-porous polymer core. To provide the porosity, a porous inorganic material is in contact with the non-porous hybrid organic-inorganic material. Embodiments of the superficially porous composite particles of the present technology can additionally feature a bonding material. As a result of using such composite particles in a chromatographic separation, the non-porous polymer core of the particle is able to remain stable at prolonged high pH.

In one aspect, the present technology is directed to a composite particle comprising a non-porous polymer particle core having a modified surface, a non-porous hybrid organic-inorganic material in contact with the modified surface, and a porous inorganic material in contact with the non-porous hybrid organic-inorganic material.

The above aspect can include one or more of the following features. The non-porous polymer particle core of the composite particles, in some embodiments, is made from a radical polymerizable monomer or monomers. In some embodiments, the non-porous polymer particle core is made from styrene, divinylbenzene, methacrylate, or acrylonitrile. In some embodiments, the non-porous polymer particle core is made from a monomer or monomers containing at least two functional groups. In some embodiments, the non-porous polymer particle is made from monomers by condensation. In some embodiments, the monomers are carboxylic acid/alcohol or carboxylic acid/amine. In some embodiments, the non-porous polymer particle core is made from a monomer or monomers that can be polymerized by ring opening polymerization. In some embodiments, the monomers are epoxides. In some embodiments, at least a portion of a modified surface of the non-porous polymer particle core comprises at least a functional group covalently bonded to the non-porous hybrid organic-inorganic coating to form a functionalized surface. In some embodiments, the functional group is at least one of organosilane, organotitanium, organozirconium characterized by C—Si, C—Ti and C—Zr bond. In some embodiments, at least a portion of the modified surface of the non-porous polymer particle core comprises at least a functional group electrostatically interacting with the non-porous hybrid organic-inorganic coating to form a functionalized surface. In some embodiments, the functional group is an amide.

The non-porous hybrid organic-inorganic material of the composite particles in some embodiments, has a thickness in the range of about 10 nm to about 200 nm. In some embodiments, the non-porous hybrid organic-inorganic material has a thickness in the range of about 25 nm to about 100 nm. In some embodiments, the non-porous hybrid organic-inorganic material has a pore volume less than 0.1 cc/g (e.g., 0.05 cc/g). In some embodiments, the non-porous hybrid organic-inorganic material comprises at least one of silica, alumina, titanium, cerium, zirconium, zirconium oxide, or a ceramic material. In some embodiments, the non-porous hybrid organic-inorganic material comprises a silicon-based hybrid organic-inorganic material.

In another aspect, the present technology is directed to a composite particle comprising a non-porous polymer particle core having a modified surface, a non-porous hybrid organic-inorganic material in contact with the modified surface, a porous inorganic material in contact with the non-porous hybrid organic-inorganic material, and a bonding material in contact with the non-porous hybrid organic-inorganic material.

The above aspect can include one or more of the following features. The bonding material of the composite particles, in some embodiments, is incorporated within the non-porous hybrid organic-inorganic material. In some embodiments, the bonding material is further deposited upon an outer surface of the composite particle. In some embodiments, the bonding material is further in contact with the modified surface. In some embodiments, the bonding material is incorporated within the modified surface, deposited upon the modified surface, or a combination thereof.

In another aspect, the present technology is directed to a composite particle comprising a non-porous polymer particle core having a modified surface, a non-porous hybrid organic-inorganic material in contact with the modified surface, the non-porous hybrid organic-inorganic material deposited on an outer most surface of a porous inorganic material to form a non-porous hybrid organic-inorganic barrier layer on the porous inorganic material on an exterior of the composite particle.

The above aspect can include one or more of the following features. The composite particles, in some embodiments, can further include a bonding material. In some embodiments, the bonding material is in contact at least a portion of the non-porous hybrid organic-inorganic material. In some embodiments, the bonding material is in contact with the non-porous hybrid organic-inorganic barrier layer. In some embodiments, the non-porous polymer particle cores are made from one or more of: styrene, divinylbenzene, methacrylate or acrylonitrile. In some embodiments, the modified surface is a silyl modified surface. In some embodiments, the porous inorganic material comprises silica. In some embodiments, the non-porous hybrid organic-inorganic material comprises a silicon-based hybrid organic-inorganic material.

The present technology provides numerous advantages over current means of chromatographic separation. For instance, using superficially porous composite particles described herein can mitigate core dissolution (i.e., silica core dissolution) in chromatographic applications. That is, a superficially porous particle, having a non-porous core with a modified surface (such as, for example a silyl modified surface), a non-porous hybrid organic-inorganic material in contact with the modified surface, and a porous inorganic shell material in contact with non-porous hybrid organic-inorganic material can provide a more stable chromatographic material than the current means used in the industry (i.e., core-shell particle with silica core). The present technology can remain stable at prolonged exposure to high pH. As a result, chromatographic separations using the composite particle described herein can lead to extended retention, better peak shape, and more efficient separation of analytes.

BRIEF DESCRIPTION OF THE DRAWINGS

The foregoing and other features and advantages provided by the present technology will be fully understood from the following description of exemplary embodiments when read together with the accompanying drawings.

The skilled artisan will understand that the drawings primarily are for illustrative purposes and are not intended to limit the scope of the inventive subject matter described herein. The drawings are not necessarily to scale; in some instances, various aspects of the inventive subject matter disclosed herein may be shown exaggerated or enlarged in the drawings to facilitate an understanding of different features. In the drawings, like reference characters generally refer to like features (e.g., functionally similar and/or structurally similar elements).

DETAILED DESCRIPTION

The present disclosure pertains to superficially porous composite particles that comprise a non-porous polymer particle core with a modified surface, a non-porous hybrid organic-inorganic material in contact with the modified surface, and a porous inorganic shell material in contact with the non-porous hybrid organic-inorganic material. That is, embodiments of the present disclosure are directed to a composite particle including a non-porous polymer (e.g., organic material) particle core having a modified surface (e.g., a silyl modified surface), a non-porous hybrid organic-inorganic material in contact with the modified surface, and a porous inorganic shell material in contact with the non-porous hybrid organic-inorganic material. In some embodiments, the superficially porous composite particles of the present disclosure further comprise a bonding material in contact with one or more of the modified surface, the non-porous hybrid organic-inorganic material, and/or the porous inorganic shell material.

Figure 1:
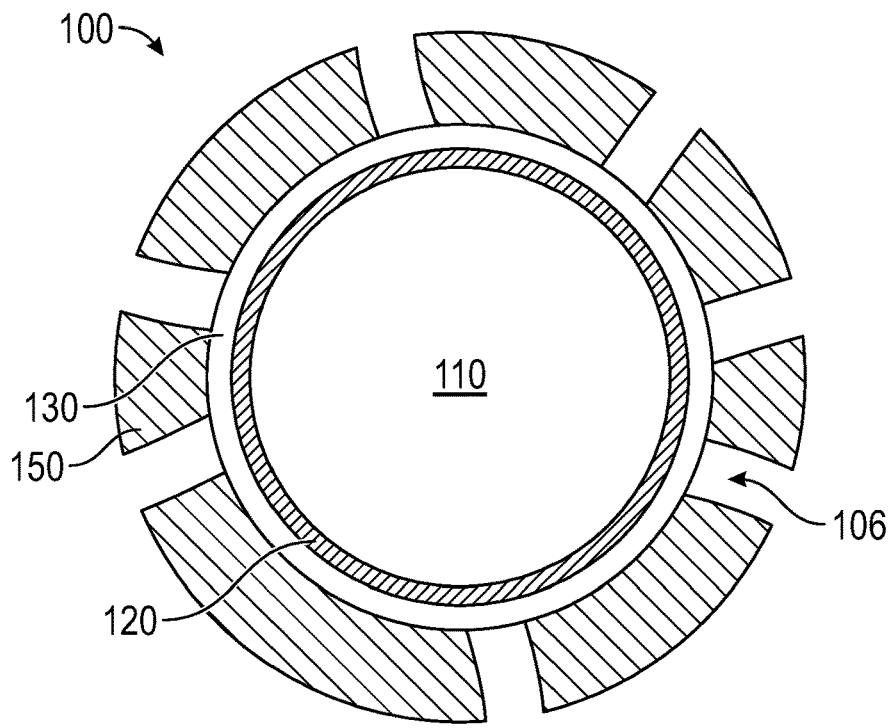
FIG. 1 is a cross-sectional schematic illustration of a superficially porous composite particle, in accordance with an embodiment of the present disclosure.

As shown in FIG. 1, a composite particle 100 according to an embodiment of the present disclosure is provided. The composite particle 100 has a non-porous polymer particle core 110, a modified surface 120 of the non-porous polymer particle core 110, a hybrid organic-inorganic non-porous material 130, and an inorganic porous shell material 150. The inorganic porous shell material 150 is deposited or grown upon the hybrid organic-inorganic non-porous material 130. The hybrid organic-inorganic material 130 is deposited or grown upon the modified surface 120.

The composite particles of the present disclosure are typically spherical. The composite particles of the present disclosure typically range from 1 to 14 microns in diameter, more typically, from 1 to 6 microns in diameter. Particle diameter is measured herein by Coulter Counter ((Beckman Coulter, Multisizer 4e Coulter Counter, Brea, CA, USA) by dispersing a sample in methanol containing 5% lithium chloride. A greater than 70,000 particle count is run using a 30 µm aperture in the volume mode for each sample. Using the Coulter principle, volumes of particles are converted to diameter, where a particle diameter is the equivalent spherical diameter, which is the diameter of a sphere whose volume is identical to that of the particle. Particle diameter measured as the 50% cumulative diameter of the volume based particle size distribution.

The composite particles of the present disclosure have a non-porous polymer core that has better stability, even at pH greater than 12, that conventional core-shell particles having a silica core.

The composite particles of the present disclosure are also typically narrowly dispersed in particle size. As defined herein, a collection of particles is "narrowly dispersed in particle size" when a ratio of 90% cumulative volume diameter divided by the 10% cumulative volume diameter is less than 1.4 when measured by Beckman Coulter, Multisizer 4e Counter Counter.

Non-Porous Polymer Core.

The polymer particle cores (e.g., 110 FIG. 1) for use in the present disclosure comprise at least one organic polymer. The organic polymer cores typically contain more than 95% organic polymer, more typically more than 97.5% organic polymer, even more typically more than 99% organic polymer.

The polymer particle cores are non-porous, which is defined herein to mean that the polymer particle cores have a pore volume that is less than 0.1 cc/g. Preferably, organic polymer cores have a pore volume that is less than 0.05 cc/g, and preferably less than 0.02 cc/g, in some embodiments. Pore volume is determined using methods known in the art based on multipoint nitrogen sorption experiments (Micromeritics ASAP 2400; Micromeritics Instruments Inc., Norcross, GA).

The polymer cores typically range, for example, from 1 to 10 microns in diameter, more typically, from 1 to 5 microns in diameter. The polymer cores are typically narrowly distributed in particle size.

Elementally, polymer particle cores for use in the present disclosure include those that are composed of carbon and hydrogen, those composed of carbon, hydrogen and oxygen, those composed of carbon, hydrogen and nitrogen, and those composed of carbon, hydrogen, nitrogen and oxygen. The backbones of the organic polymer chains forming the polymer cores may contain C—C, C—O, C—N and/or O—N covalent bonds. In some embodiments (e.g., in the case of a polymer formed by radical polymerization of vinyl groups), the backbone of the at least one organic polymer chains may contain only C—C covalent bonds.

As noted above polymer cores for use in the present disclosure comprise at least one organic polymer. The at least one organic polymer comprises residues of one or more organic monomers. The one or more organic monomers residues forming the least one organic polymer may be selected from residues of hydrophobic organic monomers, residues of hydrophilic organic monomers, or a mixture of residues of hydrophobic organic monomers and residues of hydrophilic organic monomers.

Hydrophobic organic monomers may be selected, for example, from a C2-C18 olefin monomer and/or a monomer comprising a C6-C18 monocyclic or multicyclic carbocyclic group (e.g., a phenyl group, a phenylene group, naphthalene group, etc.). Specific examples of hydrophobic organic monomers include, for example, monofunctional and multifunctional aromatic monomers such as styrene, alkyl substituted styrene, halo substituted styrene, divinylbenzene, and vinylbenzyl chloride, monofunctional and multifunctional olefin monomers such as ethylene, propylene or butylene, monofunctional and multifunctional fluorinated monomers such as fluoroethylene, 1,1-(difluoroethylene), tetrafluoroethylene, chlorotrifluoroethylene, hexafluoropropylene, perfluoropropylvinylether, or perfluoromethylvinylether, monofunctional or multifunctional acrylate monomers having a higher alkyl or carbocyclic groups, for example, monofunctional or multifunctional acrylate monomers having a C6-C18 alkyl, alkenyl or alkynyl group or a C6-C18 saturated, unsaturated or aromatic carbocyclic group, monofunctional or multifunctional methacrylate monomers having a higher alkyl or carbocyclic group, for example, monofunctional or multifunctional methacrylate monomers having a C6-C18 alkyl, alkenyl or alkynyl group or a C6-C18 saturated, unsaturated or aromatic carbocyclic group, among others.

Hydrophilic organic monomers may be selected, for example, from monofunctional or multifunctional organic monomers having an amide group, monofunctional or multifunctional organic monomers having an ester group, monofunctional or multifunctional organic monomers having a carbonate group, monofunctional or multifunctional organic monomers having a carbamate group, monofunctional or multifunctional organic monomers having a urea group, monofunctional or multifunctional organic monomers having a hydroxyl group, and monofunctional or multifunctional organic monomers having a nitrogen-containing heterocyclic group, among other possibilities. Specific examples of hydrophilic organic monomers include, for example, vinyl pyridine, N-vinylpyrrolidone, N-vinyl-piperidone, N-vinyl caprolactam, lower alkyl acrylates (e.g., methyl acrylate, ethyl acrylate, etc.), lower alkyl methacrylates (e.g., methyl methacrylate, ethyl methacrylate, etc.), vinyl acetate, acrylamide or methacrylamide monomers, hydroxypolyethoxy allyl ether monomers, ethoxy ethyl methacrylate, glycidyl methacrylate, ethylene glycol dimethacrylate, methylene bisacrylamide, allyl methacrylate, or diallyl maleate.

In various embodiments, the non-porous polymer cores comprise residues of multifunctional hydrophobic organic monomers such as divinylbenzene and/or multifunctional hydrophilic organic monomers, such as ethylene glycol dimethacrylate, methylene bisacrylamide or allyl methacrylate, in order to provide crosslinks in the organic copolymer. In certain embodiments, DVB 80 may be employed, which is an organic monomer mixture that comprises divinylbenzene (80%) as well as a mixture of ethyl-styrene isomers, diethylbenzene, and can include other isomers as well.

In various embodiments, the polymer core may comprise residues of only multifunctional organic monomers. In various embodiments, the polymer may comprise residues of both multifunctional organic monomers and monofunctional organic monomers.

The present inventors have found that, in some embodiments, the porosity of a material formed from an polymer containing multifunctional organic monomer residues can be reduced by adding monofunctional organic monomer residues to the polymer, or that the porosity of a material formed from a polymer containing multifunctional organic monomer residues and monofunctional organic monomer residues can be reduced by increasing an amount of the monofunctional organic monomer residues relative to the multifunctional organic monomer residues in the polymer. For example, it has been found that polymer particle cores formed from DVB 80 (which are formed from organic polymers containing 80% multifunctional divinyl benzene monomer residues and monofunctional ethylstyrene monomer residues as explained above) have a porosity of about 0.015 cc/g, whereas organic polymer cores formed from DVB 80 and styrene (which contain multifunctional divinyl benzene monomer residues, monofunctional ethylstyrene monomer residues, and additional monofunctional styrene monomer residues) have a porosity of less than 0.007 cc/g.

In some embodiments, polymer particle cores are created in which a central region of the cores is formed from an organic copolymer containing multifunctional organic monomer residues and monofunctional organic monomer residues and an outer region of the cores is formed from an organic homopolymer containing only multifunctional organic monomer residues. In some embodiments, organic polymer cores are created in which a central region of the cores is formed from an organic copolymer containing multifunctional organic monomer residues and monofunctional organic monomer residues and an outer region of the cores is also formed from an organic copolymer containing multifunctional organic monomer residues and monofunctional organic monomer residues, but wherein a molar ratio of the multifunctional organic monomer residues relative to the monofunctional organic monomer residues is increased in the outer core region relative to the central core region. In a particular example, organic polymer cores are created in which a central region of the cores is formed from DVB and styrene and an outer region of the cores is formed from DVB. In other embodiment, the molar ratio of the multifunctional organic monomer residues relative to the monofunctional organic monomer residues is decreased in the outer core region relative to the central core region.

In various embodiments, an entire polymer particle core may be formed from an organic polymer that comprises residues of multifunctional organic monomers but does not contain resides of monofunctional organic monomers. In various embodiments, an entire polymer particle core may be formed from an organic polymer that comprises residues of both multifunctional organic monomers and monofunctional organic monomers.

The polymers forming the polymer particle cores can be prepared via a number of processes and mechanisms including, but not limited to, chain addition and step condensation processes, radical, anionic, cationic, ring-opening, group transfer, metathesis, and photochemical mechanisms. In particularly beneficial embodiments, the non-porous polymer particle cores are prepared via free radical polymerization.

The polymer particle cores of the present disclosure can be prepared in some embodiments by a dispersion polymerization process in which a homogeneous solution is formed, wherein monomers, initiator and stabilizer are combined in a solvent or solvent mixture. As polymerization proceeds, the initially formed polymers precipitate from the homogeneous solution to form nuclei. The nuclei that form still bear reactive sites such as radicals which allow them to keep growing by continuous capture and incorporation of monomers and/or oligomers from the solution.

In an exemplary process based on radical polymerization, one or more solvents and one or more stabilizers are purged with nitrogen to remove dissolved oxygen. Then, one or more monomers, including at least one multifunctional monomer, and a radical polymerization initiator are added. Radical polymerization is initiated by raising the temperature for several hours, typically under agitation. Based on the desired particle diameter, further radical polymerization initiator and further monomer may be added to the reaction mixture to allow the particle further to grow to the desired size. After reaction, the particles may be thoroughly washed and dried under vacuum.

Any radical initiator that is compatible with the organic phase may be used, either alone or in a mixture of such radical initiators. In particular embodiments, the radical initiators are capable of being heat activated or photoactivated. In specific embodiments, the radical initiator is a peroxide, a peroxyacetate, a persulfate, an azo initiator or a mixture thereof.

Where the initiator is a thermal initiator, the resulting solution may then be heated to an elevated temperature under agitation to activate the thermal initiator(s) and maintained at elevated temperature until polymerization is complete. Where the initiator is a photoinitiator, the resulting solution may then be illuminated under agitation with light having a suitable wavelength to activate the photoinitiator(s) and maintained until polymerization is complete. Suitable organic monomers for use in the organic phase are described above.

Solvent systems for the formation of polymer particle cores include methanol, ethanol, isopropanol, 2-methoxyehanol, water, acetonitrile, p-xylene, and toluene.

Stabilizers that can be employed for the formation of polymer particle cores include, for example, polyvinylpyrrolidone (PVP), non-ionic surfactants including alkylphenol ethoxylates (e.g., Triton™ N-57, available from Dow Chemical), polyvinyl alcohol (PVA) such as Selvol™ Polyvinyl Alcohol solution, available from Sekisui Special Chemicals), modified celluloses, including alkyl-modified celluloses such as methyl celluloses (e.g., Methocel™, available from DuPont) and hydrophobically modified celluloses hydroxyethylcellulose stabilizers such as Natrosol™ cetyl modified hydroxyethylcellulose (available from Ashland), and ionic surfactants including sodium alkyl sulfates such as sodium dodecyl sulfate (SDS) and sodium oleyl sulfate, among others.

In a particular embodiment of non-porous polymer particle core formation, the monomer is a combination of DVB and styrene, the initiator is 2,2'-Azobis(2-methylpropionitrile) (AIBN), the solvent system is a combination of reagent alcohol and p-xylene, and the stabilizer is polyvinyl pyrrolidone (PVP 40).

Once formed, the organic polymer cores may contain surface moieties from which further polymerization can proceed. For example, non-porous polymer particle cores formed from free radical polymerization commonly contain residual radical-polymerizable unsaturated surface moieties (e.g., ethylenyl moieties, vinyl moieties, methacryloxy moieties, or acryloxy moieties, etc.), from which further core growth can proceed. Such further polymerization may be used to increase the size of a given batch of polymer particle cores by adding an additional thickness of non-porous organic polymer to previously formed non-porous polymer particle cores.

In a particular embodiment of non-porous polymer particle core growth, the monomer is DVB, the solvent is reagent alcohol, and the stabilizer is polyvinyl pyrrolidone (PVP 40).

Surface-Modified Non-Porous Polymer Core.

The superficially porous polymer particle in accordance with the present technology includes a modified surface (e.g., 120, FIG. 1) of the non-porous polymer core. The modified surface of the non-porous polymer particle core, in some embodiments, can form a covalent or electrostatic bond with a subsequently applied non-porous hybrid organic-inorganic material. In certain embodiments, the modified surface of the non-porous polymer core is a silyl modified surface. The silyl modified surface can include a first functionality and a second functionality. For example, the first functionality can be a reactive silane (e.g., alkoxy) and the second functionality can be an organic polymerizable group (e.g., vinyl).

In some embodiments, the modified surface of the non-porous polymer particle core can have a thickness ranging from 1 to 300 nm, for example ranging anywhere from 1 to 3 to 10 to 30 to 100 to 300 nm (i.e., ranging between any two of the preceding values).

In some embodiments, the modified surface includes a surface polymer, which may comprise functional groups that covalently or electrostatically bond to the hybrid organic-inorganic non-porous shell. Examples of functional groups that electrostatically bond to the hybrid organic-inorganic non-porous shell include amide functional groups and amine functional groups. In this regard, the hybrid organic-inorganic non-porous materials described herein are weakly acidic in nature and thus tend to be deprotonated and negatively charged, whereas the amide functional groups or amine functional groups described herein are basic in nature and thus tend to be protonated and positively charged. Examples of functional groups that covalently bond to the hybrid organic-inorganic non-porous shell include organosilane functional groups, and organometallic functional groups such as organotitanium functional groups and organozirconium functional groups, among others. As used herein, an organosilane functional group is a functional group having at least one Si—C bond. Similarly, an organotitanium functional group is a functional group having at least one Ti—C bond, and an organozirconium functional group is a functional group having at least one Zr—C bond.

In some embodiments, the modified surface includes a surface polymer, which may comprise monomer residues that covalently or electrostatically bond to the hybrid organic-inorganic non-porous shell. Examples of monomer residues that electrostatically bond to the hybrid organic-inorganic non-porous shell include amide monomer residues and amine monomer residues. Examples of monomer residues that are covalently bonded to the hybrid organic-inorganic non-porous shell include organosilane monomer residues, organotitanium monomer residues, and organozirconium monomer residues. As used herein, an organosilane monomer residue is a monomer residue having at least one Si—C bond, an organotitanium monomer residue is a monomer residue having at least one Ti—C bond, and an organozirconium monomer residue is a monomer residue having at least one Zr—C bond.

The surface polymer may, comprise, for example, polymer chains that are grafted on the non-porous polymer core.

The surface polymer may, comprise, for example, a crosslinked polymer network that is formed on the non-porous polymer particle core.

Surface polymers can be prepared via a number of processes and mechanisms including, but not limited to, chain addition and step condensation processes, radical, anionic, cationic, ring-opening, group transfer, metathesis, and photochemical mechanisms. In particularly beneficial embodiments, the non-porous organic polymer cores are prepared via free radical polymerization.

As noted above, polymer particle cores may contain surface moieties from which further polymerization can proceed. For example, organic polymer cores formed from free radical polymerization commonly contain residual radical-polymerizable unsaturated surface moieties (e.g., ethylenyl moieties, vinyl moieties, methacryloxy moieties, acryloxy moieties, etc.), from which polymerization of the surface polymer can proceed. Polymer chains can be from monofunctional monomers. Crosslinked polymer networks can be formed from multifunctional monomers. Monofunctional monomers may be included in addition to multifunctional monomers in such crosslinked polymer networks.

As noted above, surface polymers include those comprising amide monomer residues. Examples of amide monomer residues include amide monomer residues having the formula,

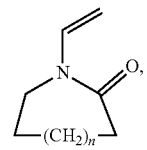

wherein n is an integer from 1-3 (i.e., N-vinyl pyrrolidone, N-vinyl-2-piperidinone or N-vinyl caprolactam). Examples of amide monomer residues also include amide monomer residues having the formula

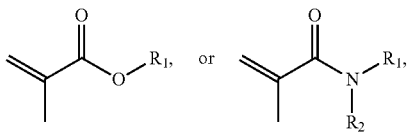

wherein R1 is selected from C1-C6 alkylene, C2-C6 alkenylene, C2-C6 alkynylene, C6-C18 arylene groups, and wherein R2 is selected from H, C1-C6 alkylene, C2-C6 alkenylene, C2-C6 alkynylene, C6-C18 arylene groups.

As also noted above, surface polymers include those comprising amine monomer residues. Examples of amine monomer residues include aminoalkyl acrylates, aminoalkyl methacrylates, dialkylaminoalkyl acrylates, or dialkylaminoalkyl methacrylates, including amino-C1-C4-alkyl acrylates, amino-C1-C4-alkyl methacrylates, di-C1-C4-alkylamino-C1-C4-alkyl acrylates, di-C1-C4-alkylamino-C1-C4-alkyl methacrylates, such as 2-aminoethyl acrylate, 2-aminoethyl methacrylate, 2-(N,N-dimethylamino)ethyl acrylate, 2-(N,N-dimethylamino)ethyl methacrylate, 2-(N, N-diethylamino)ethyl methacrylate, or 2-diisopropylaminoethyl methacrylate.

As further noted above, examples of surface polymers further include those comprising silane monomer residues that are electrostatically bonded to the non-porous hybrid organic-inorganic material. In some embodiments, the surface polymers comprise residues of one or more radical polymerizable organosilane monomers.

Specific examples of radical polymerizable organosilane monomers include unsaturated organosilane monomers (e.g., unsaturated organoalkoxysilane monomers, unsaturated organochlorosilane monomers, etc.), such as alkenyl- or alkynyl-functionalized organosilane monomers (e.g., alkenyl- or alkynyl-functionalized organoalkoxysilane monomers, alkenyl- or alkynyl-functionalized organochlorosilane monomers, etc.). Particular alkenyl-functionalized organoalkoxysilane monomers including those with vinyl groups, methacryloxy groups, and acryloxy groups. Specific examples include 3-(trimethoxysilyl)propyl methacrylate (also so known as 3-methacryloxypropyltrimethoxysilane, or MAPTMOS), methacryloxypropyltriethoxysilane, methacryloxypropyltrichlorosilane, vinyltriethoxysilane (VTES), vinyltrimethoxy silane, N-(3-acryloxy-2-hydroxypropyl)-3-aminopropyltriethoxy silane, (3-acryloxypropyl)trimethoxy silane, O-(methacryloxyethyl)-N-(triethoxysilylpropyl)urethane, N-(3-methacryl oxy-2-hydroxypropyl)-3-aminopropyltriethoxysilane, methacryloxymethyltriethoxysilane, methacryloxymethyltrimethoxysilane, methacryloxypropylmethyldiethoxysilane, methacryloxypropylmethyldimethoxysilane, methacryloxypropyltris (methoxyethoxy) silane, or 3-(N-styrylmethyl-2-aminoethylamino)propyltrimethoxysilane hydrochloride, among others.

In a particular embodiment of a process for forming a surface modified non-porous organic polymer core, an organosilane polymer, specifically, a poly(styryl-C1-C4-alkyl-tri-C1-C4-alkoxy silane), is formed by copolymerizing a styryl-C1-C4-alkyl-tri-C1-C4-alkoxysilane monomer where R is C1-C4 alkyl, with residual vinyl groups (e.g., residues of divinylbenzene) on a non-porous organic polymer core. Examples of styrene-based organosilane monomers include styrylethyltrimethoxysilane and styryltrimethoxysilane.

Non-Porous Hybrid Organic-Inorganic Material.

As previously noted, the present disclosure pertains to composite particles in which a non-porous hybrid organic-inorganic material (e.g., 130 FIG. 1) is in contact with a modified surface of a non-porous polymer core.

In some embodiments, the non-porous hybrid organic-inorganic material may have a thickness ranging for, for example, 10 nm to 200 nm, typically, from 25 nm to 100 nm. In some embodiments, the non-porous hybrid organic-inorganic material may have a pore volume, for example, less than 0.1 cc/g (e.g., 0.05 cc/g), typically, less than 0.02 cc/g.

A "hybrid organic-inorganic" material includes inorganic-based structures wherein an organic functionality is integral to both the internal or "skeletal" inorganic structure as well as the hybrid material surface. The inorganic portion of the hybrid material may be, e.g., silica, alumina, titanium, cerium, or zirconium or oxides thereof, or ceramic material. Exemplary hybrid materials are shown in U.S. Pat. Nos. 4,017,528, 6,528,167, 6,686,035, 7,175,913 and 7,919,177, the disclosures of which are hereby incorporated in their entirety.

In some embodiments, the non-porous hybrid organic-inorganic material may comprise a silicon-based hybrid organic-inorganic material that includes hybrid regions in which the silicon-based non-porous hybrid organic-inorganic material comprises silicon atoms having one or more silicon-oxygen bonds and one or more silicon-carbon bonds. In some cases, the hybrid regions may comprise a substituted or unsubstituted alkylene, alkenylene, alkynylene or arylene moiety bridging two or more silicon atoms. For example, the hybrid regions may comprise a substituted or unsubstituted C1-C18 alkylene, C2-C18 alkenylene, C2-C18 alkynylene or C6-C18 arylene moiety bridging two or more silicon atoms. In some embodiments, the hybrid regions may comprise a substituted or unsubstituted C1-C6 alkylene moiety bridging two or more silicon atoms, including methylene, dimethylene or trimethylene moieties bridging two silicon atoms. In some embodiments, the hybrid regions may comprise ≡Si—(CH$_2$)n—Si≡ moieties, where n is an integer, and may be equal to 1, 2, 3, 4 or more. In some embodiments, the non-porous hybrid organic-inorganic material may comprise a silicon-based non-porous hybrid organic-inorganic material that further comprises inorganic regions in which the material comprises silicon atoms having four silicon-oxygen bonds, in addition to hybrid regions in which the material comprises silicon atoms having one or more silicon-oxygen bonds and one or more silicon-carbon bonds.

In various embodiments, the non-porous hybrid organic-inorganic material may be formed by hydrolytically condensing one or more organosilane compounds on surface modified non-porous organic polymer cores, such as those described above. As used herein, an organosilane compound is a silane compound having at least one Si—C bond.

The organosilane compounds may comprise, for example, (a) one or more organosilane compounds of the formula SiZ1Z2Z3Z4, where Z1, Z2, Z3 and Z4 are independently selected from Cl, Br, I, C1-C4 alkoxy, C1-C4 alkylamino, and C1-C4 alkyl, where at least one of Z1, Z2, Z3 and Z4 is C1-C4 alkyl, examples of which include alkyl-trialkoxysilanes such as C1-C4-alkyl-tri-C1-C4-alkoxysilanes, including methyl triethoxysilane, methyl trimethoxysilane, ethyl trimethoxysilane or ethyl triethoxysilane, and dialkyl-dialkoxysilanes, for example, C1-C4-dialkyl-di-C1-C4-alkoxysilanes, such as dimethyl diethoxysilane, dimethyl dimethoxysilane, diethyl dimethoxysilane or diethyl diethoxysilane, among many other possibilities and/or (b) one or more organosilane compounds of the formula Z1Z2Z3Si—R—SiZ4Z5Z6, where Z1, Z2 and Z3 are independently selected from Cl, Br, I, C1-C4 alkoxy, C1-C4 alkylamino, and C1-C4 alkyl, although at most two of Z1, Z2 and Z3 can be C1-C4 alkyl, where Z4, Z5 and Z6 are independently selected from Cl, Br, I, C1-C4 alkoxy, C1-C4 alkylamino, and C1-C4 alkyl, although at most two of Z4, Z5 and Z6 can be C1-C4 alkyl, and where R is an organic radical, for example, selected from C1-C18 alkylene, C2-C18 alkenylene, C2-C18 alkynylene or C6-C18 arylene groups, typically, C1-C4 alkylene, typically, C1-C6 alkylene. Examples of compounds of the formula Z1Z2Z3Si—R—SiZ4Z5Z6 include bis(trialkoxysilyl)alkanes, for instance, bis(tri-C1-C4-alkoxy silyl)C1-C4-alkanes such as bis(trimethoxysilyl)methane, bis(trimethoxysilyl)ethane, bis(triethoxysilyl)methane, and bis (triethoxysilyl)ethane, among many other possibilities.

In some embodiments, one or more additional non-organosilane compounds may be hydrolytically condensed along with the one or more organosilane compounds. Such compounds include silane compounds of the formula SiZ1Z2Z3Z4, where Z1, Z2, Z3 and Z4 are independently selected from Cl, Br, I, C1-C4 alkoxy and C1-C4 alkylamino. In certain embodiments the additional silane compounds are tetra-C1-C4-alkoxysilanes such as tetramethoxysilane or tetraethoxysilane.

In some embodiments, the non-porous hybrid organic-inorganic material may be formed by hydrolytically condensing the following on the modified surface of the non-porous organic polymer core as described above: (a) one or more alkyoxysilanes, for example, tetraalkoxysilanes (e.g., tetramethoxysilane (TMOS), tetraethoxysilane (TEOS), etc.) and (b) one or more organosilanes, for example, selected from bis(trialkoxysilyl)alkanes (e.g., bis(trimethoxysilyl)methane, bis(trimethoxysilyl)ethane, bis(triethoxysilyl)methane, bis(triethoxysilyl)ethane (BTEE), etc.) and/or alkyltrialkoxysilanes (e.g., methyl trimethoxysilane, methyl triethoxysilane (MTOS), ethyl triethoxysilane, etc.). Where the plurality of silane compounds comprises one or more bis(trialkoxysilyl)alkanes, alkyl-bridged non-porous hybrid organic-inorganic materials are prepared, which can offer various advantages over conventional silica-based materials, including chemical and mechanical stability. When BTEE is employed as a monomer, the resulting materials are ethylene bridged hybrid (BEH) materials. One particular BEH material can be formed from hydrolytic condensation of TEOS and BTEE.

In some embodiments, a plurality of silane compounds as described above, for example, a plurality of silane compounds comprising one or more organosilanes and one or more tetraalkoysilanes are partially condensed to form a polyalkoxyorganosiloxane oligomer, which is then hydrolytically condensed onto the modified surface of the non-porous organic polymer core. For example, BTEE and TEOS can be partially condensed to form a polyethoxyorganosiloxane oligomer (PEOS), which is hydrolytically condensed onto the modified surface of the non-porous organic polymer core.

In various embodiments, the non-porous hybrid organic-inorganic material may be formed by creating (typically in a series of steps) a reaction mixture comprising the following components: surface modified non-porous organic polymer cores, ethanol, one or more silanes including one or more organosilanes as previously described (e.g., TEOS and BTEE, or PEOS), water, and a basic or acidic catalyst to promote silane hydrolysis and condensation of non-porous hybrid organic-inorganic material on the modified surface of the non-porous organic polymer cores. In some embodiments, the hydrolysis proceeds at room temperature. In some embodiments, the mixture is heated to drive the hydrolysis reaction to completion. In some embodiments, the mixture is agitated. After forming the hybrid organic-inorganic non-porous material, the resulting particles may be washed and dried.

In other embodiments, the non-porous hybrid organic-inorganic material may be formed by interaction between a template surfactant (e.g., and ionic surfactant such as cetyltrimethyl ammonium bromide (CTAB) or trioctylmethylammonium bromide (TOMB)) and one or more silanes including one or more organosilanes as previously described (e.g., TEOS and BTEE, or PEOS) during continuous addition of silanes, basic catalyst and template surfactant to the modified surface of the non-porous organic polymer cores. This process leads to continuous silane hydrolysis and condensation of hybrid organic-inorganic reaction product on the cores. The reaction may be conducted at room temperature or at elevated temperatures.

One or more organosilanes as previously described (e.g., TEOS and BTEE, or PEOS) may be hydrolyzed in the presence of a surface modified non-porous (NP) organic polymer core having a surface polymer that comprises monomer residues of amide monomers and/or silane monomers such that the hydrolyzed organosilanes form a non-porous hybrid organic-inorganic material on the modified surface of the non-porous polymer core.

Porous Inorganic Material.

As previously noted, the present disclosure pertains to composite particles in which a porous inorganic material is in contact with the non-porous hybrid organic-inorganic non-porous material. For example, as shown for composite particle 100 in FIG. 1, porous inorganic material 150 is deposited or grown upon the non-porous hybrid organic-inorganic material 130. The non-porous hybrid organic-inorganic material 130 is deposited or grown upon the modified surface 120. Pores 106 extend within the inorganic porous shell material 150. As a result, particle 100 has a non-porous center portion (e.g., core 110, non-porous hybrid organic-inorganic material 130) and a porous shell portion (e.g., porous inorganic material 150).

The porous inorganic material (i.e., material 150) has a pore volume that is 0.1 cc/g or greater (e.g., 0.2 cc/g of material 150), preferably greater than 0.65 cc/g. In various embodiments, the porous inorganic material has a pore volume that is substantially greater than 0.15 cc/g of the porous inorganic material, for example, having a pore volume ranging from 0.2 to 1.5 cc/g, preferably ranging from 0.4 to 0.75 cc/g of the porous inorganic material.

In some embodiments, the porous inorganic material may range, for example, from 0.1 to 4 microns in thickness, typically, from 0.1 to 2 microns in thickness, more typically, from 0.1 to 1.2 microns in thickness. In some embodiments, a ratio of the diameter of the cores to the diameter of the entire particles may range, for example, from 0.3:1 to 0.99:1, more typically, from 0.65:1 to 0.8:0.9.

In some embodiments, the porous inorganic material may comprise a silicon-based inorganic material that comprises regions in which the material comprises silicon atoms having one or more silicon-oxygen bonds. For example, the porous inorganic material may comprise a silicon-based inorganic material that further comprises regions in which the material comprises silicon atoms having four silicon-oxygen bonds.

Figure 2:
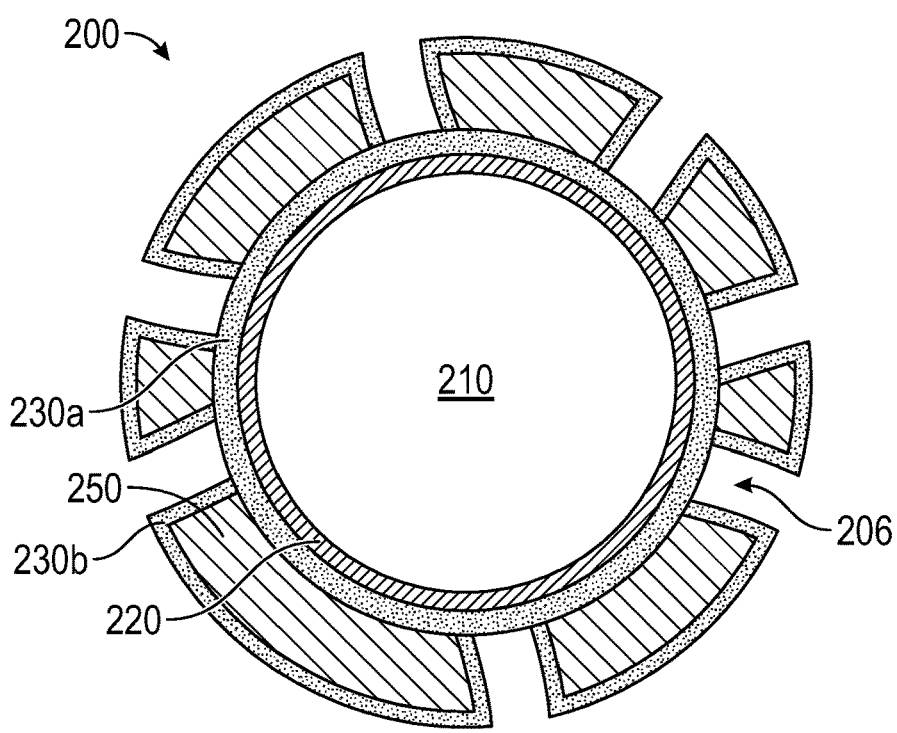
FIG. 2 is a cross-sectional schematic illustration of a superficially porous composite particle, in accordance with another embodiment of the present disclosure.

In some embodiments, non-porous hybrid organic-inorganic material may be deposited or grown upon the composite particle. For example, as shown in composite particle 200 of FIG. 2, a non-porous hybrid organic-inorganic material 230b is deposited or grown upon porous inorganic material 250 having pores 206. The porous inorganic material 250 is deposited or grown upon non-porous hybrid organic-inorganic material 230a, which may be the same material as 230b or different from the material of 230b. Non-porous hybrid organic-inorganic material 230a is deposited or grown upon a modified surface 220 of a non-porous polymer particle core 210.

Non-porous hybrid organic-inorganic material 230b protects underlying porous inorganic material 250. That is non-porous hybrid organic-inorganic material 230b shields or reduces dissolution of porous inorganic material 250 by forming a barrier layer about the porous inorganic material 250 on the exterior of the composite particle 200.

Bonding Material.

As previously noted, in some embodiments, the composite particles as disclosed herein may additionally include a bonding material, which modifies one or more portions of the composite particles. For example, the modified surface, non-porous hybrid organic-inorganic material, and/or porous inorganic material may be modified with bonding material. The modification may be intrinsic modification (i.e., including the bonding material when depositing or growing a portion of the particle), surface modification (i.e., applying the modification to an exposed surface of the particle), or a combination thereof. It is noted that intrinsic modification of porous inorganic material with a bonding material (e.g., a silane) results in a transformation of the porous inorganic material into a hybrid inorganic-organic material. That is, incorporation of bonding material when depositing inorganic material results in the transformation/creation of a hybrid material that includes both inorganic material and organic material (e.g., from the incorporation of the bonding material).

Figure 3:
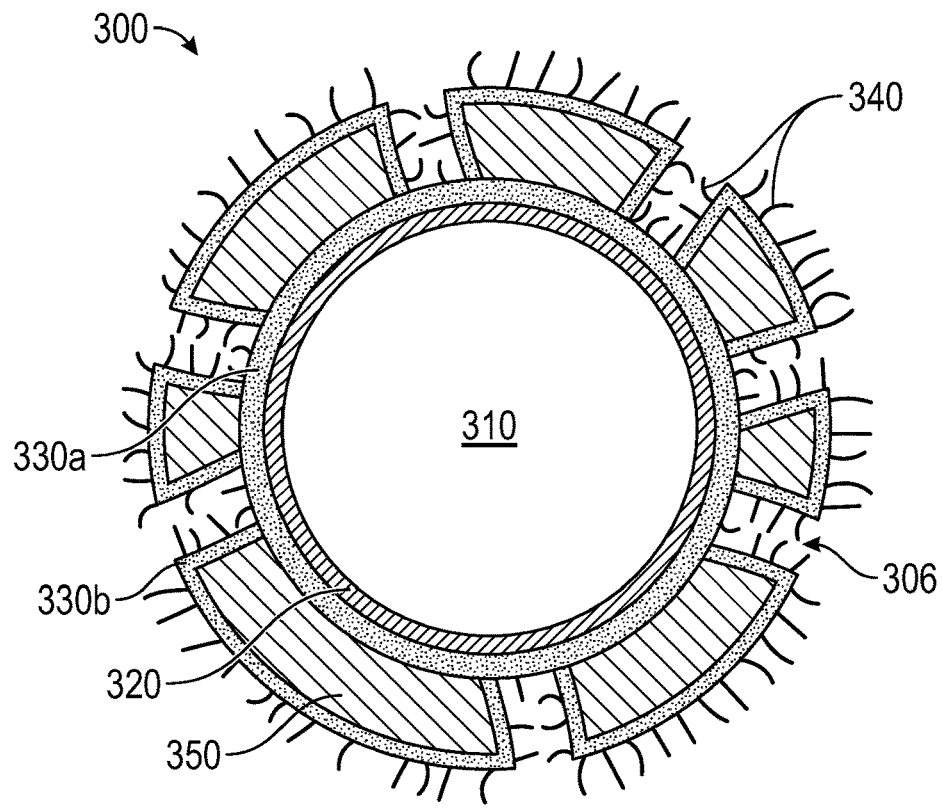
FIG. 3 is a cross-sectional schematic illustration of a superficially porous composite particle, in accordance with another embodiment of the present disclosure.

As shown in FIG. 3, in an embodiment of a composite particle 300 having a non-porous polymer core 310 and a modified surface 320, a bonding material is applied to exterior portions of the particle 300. Specifically, a non-porous hybrid organic-inorganic material 330$b$ is surface modified with a bonding material 340; forming a layer or region extending from the non-porous hybrid organic-inorganic material 330$b$. The non-porous hybrid organic-inorganic material 330$b$ is deposited or grown upon porous inorganic material 350, which is also in contact with a non-porous hybrid organic-inorganic material 330$a$. The non-porous hybrid organic-inorganic material 330$a$ may not be in contact with the porous inorganic material 350 where pores 306 extend to the surface of the non-porous hybrid organic-inorganic material 330$a$. Where the non-porous hybrid organic-inorganic non-porous material 330$a$ is not in contact with the porous inorganic material 350, the non-porous hybrid organic-inorganic non-porous material 330$a$ may also be surface modified with bonding material 340, although this need not be the case. In some embodiments, the non-porous hybrid organic-inorganic material 330$b$ is also deposited or grown upon the hybrid organic-inorganic non-porous material 330$a$, and the non-porous hybrid organic-inorganic material 330$b$ is surface modified with bonding material 340. In these cases, the non-porous hybrid organic-inorganic material 330$b$, which is surface modified with the bonding material 340, extends to the hybrid organic-inorganic non-porous material 330$a$ within pores 306.

In some embodiments, both the non-porous hybrid organic-inorganic material 330$a$ and the non-porous hybrid organic-inorganic material 330$b$ are the same material (i.e., chemically, structurally the same). That need not be the case, however. In some embodiments, the non-porous hybrid organic-inorganic material 330$a$ is different than the non-porous hybrid organic-inorganic material 330$b$ that is added after growth of the porous inorganic material 350. For example, non-porous hybrid organic-inorganic material 330$a$ and non-porous hybrid organic-inorganic material 330$b$ can be chemically distinct and/or can have different microstructures. In some embodiments, non-porous hybrid organic-inorganic material 330$b$ can have a pore-volume that differs from the pore volume of hybrid organic-inorganic material 350$a$. However, both hybrid organic-inorganic materials 330$a$ and 330$b$ are non-porous and thus have a pore volume of less than 0.1 cc/g. For example, in one embodiment, non-porous hybrid organic-inorganic material 330$b$ can have a pore volume of 0.02 cc/g, whereas non-porous hybrid organic-inorganic material 330$a$ has a pore volume of 0.05 cc/g.

Figure 4:
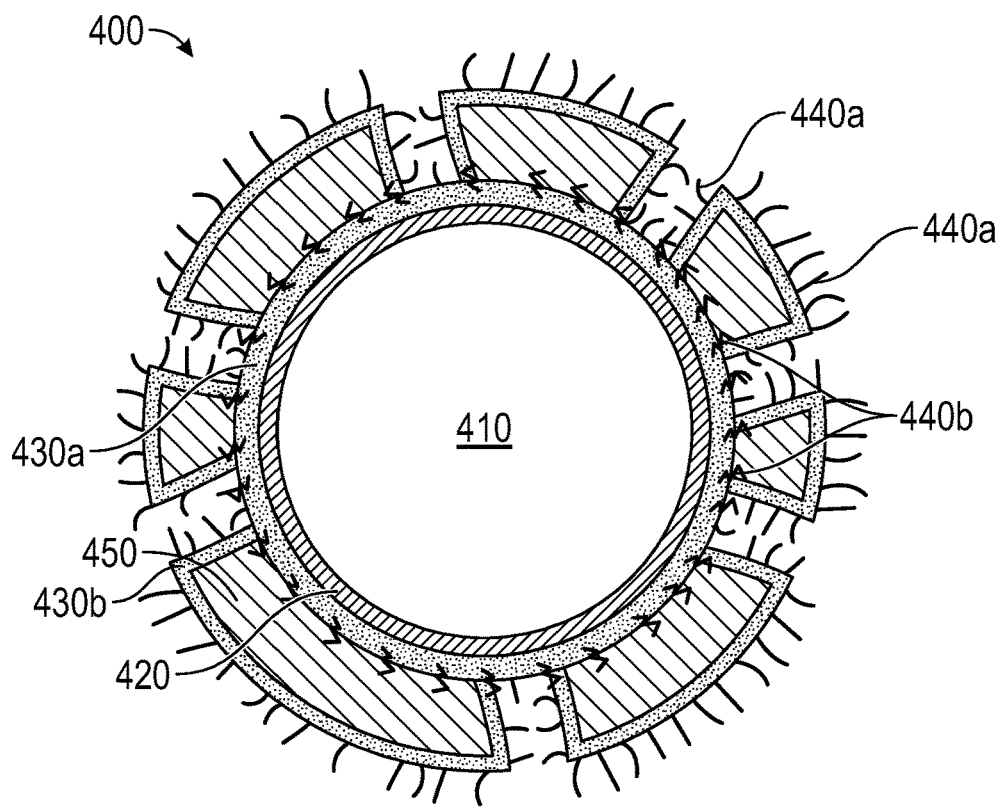
FIG. 4 is a cross-sectional schematic illustration of a superficially porous composite particle, in accordance with another embodiment of the present disclosure.

In another embodiment (composite particle 400), and as shown in FIG. 4, bonding material can be incorporated both intrinsically and through surface modification. Composite particle 400 includes a non-porous polymer core 410 having a modified surface 420. Deposited or grown on the modified surface 420 is a non-porous hybrid organic-inorganic material 430$a$. A porous material 450 is in contact with both non-porous hybrid organic-inorganic material 430$a$ as well as a non-porous hybrid organic-inorganic material 430$b$, which can be deposited on the porous material 450.

Non-porous hybrid organic-inorganic material 430$b$ is surface modified with a bonding material 440$a$. In addition, non-porous hybrid organic-inorganic material 430$a$ and porous material 450 are intrinsically modified with a bonding material 440$b$. That is, bonding material 440$b$ is incorporated in at least a portion of the non-porous hybrid organic-inorganic material 430$a$ and in at least a portion of the porous material 450. It is noted that when bonding material 440$b$ is incorporated into a portion of porous material 450, its incorporation can transform the material. For example, in embodiments in which the porous material is before incorporation of 440$b$ an inorganic material, the in sync deposition of a porous inorganic material together with bonding material results in a transformation to a porous hybrid inorganic-organic material.

In some embodiments (not shown), the bonding material 440$b$ can be included within the hybrid organic-inorganic non-porous material 430$a$ as a gradient (i.e., concentration of bonding material 440$b$ varying through thickness). The non-porous hybrid organic-inorganic material 430$a$ (where not in contact with the porous material 450) and non-porous hybrid organic-inorganic material 440$b$ are additionally surface modified with the bonding material 440$a$. The non-porous hybrid organic-inorganic material 430$a$ is in contact (e.g., has been modified) with bonding materials 440$a$ and 440$b$, and the non-porous hybrid organic-inorganic material 430$b$ and a portion of the porous material 450 are in contact (e.g., has been modified) with the bonding material 440$a$.

In some embodiments, the bonding material 440$b$ incorporated within the non-porous hybrid organic-inorganic material 430$a$ and at least some portion of the porous material 450 is the same as the bonding material 440$a$ that is added after growth of the non-porous hybrid organic-inorganic material 430$b$. That need not be the case, however. In some embodiments, the bonding material 440$b$ within the non-porous hybrid organic-inorganic material 430$a$ is different than the bonding material 440$a$ that is added after growth of the non-porous hybrid organic-inorganic 430$b$ (e.g., an end cap is supplied outside of hybrid material 430$b$, or a charge is added to create a charged surface).

In some embodiments, both the non-porous hybrid organic-inorganic material 430$a$ and the non-porous hybrid organic-inorganic material 430$b$ are the same material (i.e., chemically, structurally the same). That need not be the case, however. In some embodiments, the non-porous hybrid organic-inorganic material 430$a$ is different than the non-porous hybrid organic-inorganic material 430$b$ that is added after growth of the porous material 450. For example, non-porous hybrid organic-inorganic material 430$a$ and non-porous hybrid organic-inorganic material 430$b$ can be chemically distinct and/or can have different microstructures.

Figure 5:
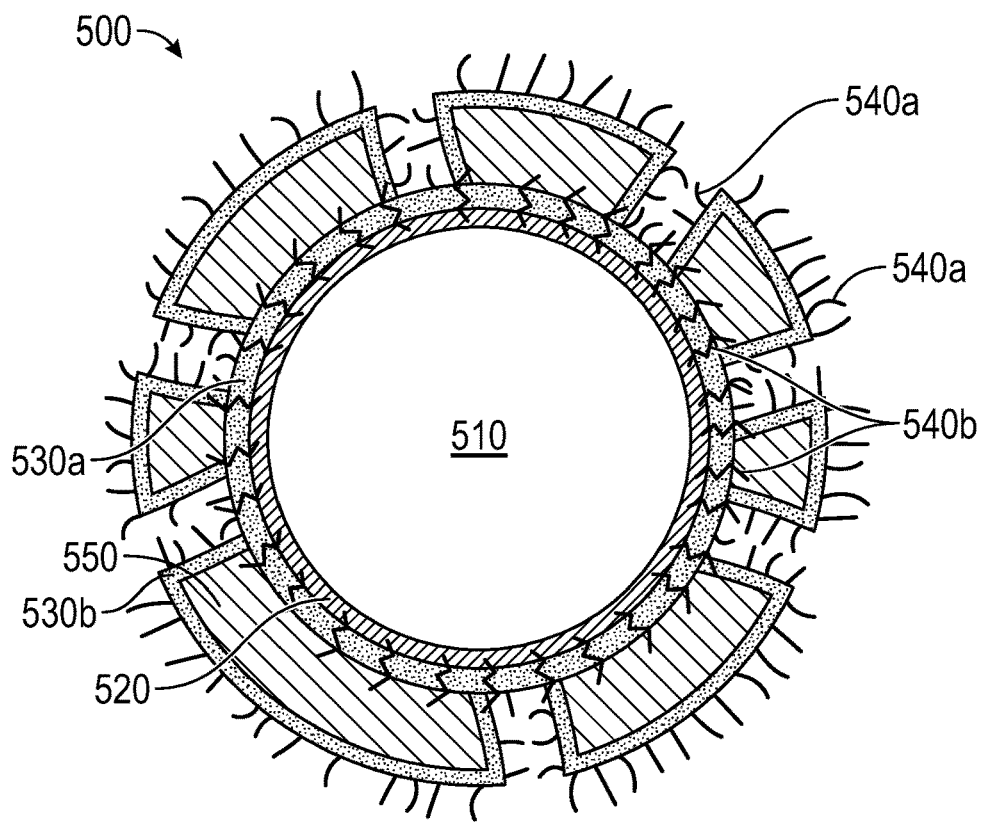
FIG. 5 is a cross-sectional schematic illustration of a superficially porous composite particle, in accordance with another embodiment of the present disclosure.

In another embodiment (composite particle 500 having non-porous polymer core 510, see FIG. 5), a non-porous hybrid organic-inorganic material 530b is surface modified with a bonding material 540a. In addition, a modified surface 520, a non-porous hybrid organic-inorganic material 530a, and at least a portion of porous material 550 are intrinsically modified with a bonding material 540b. That is, the bonding material 540b is incorporated in at least a portion of the porous material 550, the non-porous hybrid organic-inorganic material 530a, and the modified surface 520. In some embodiments (not shown), the bonding material 540b can be included within the porous material 550 and/or the non-porous hybrid organic-inorganic material 530b as a gradient (i.e., concentration of bonding material 540b varying through thickness of particle 500).

It is noted that porous material 550 is a porous hybrid inorganic-organic material. That is, the incorporation (or in sync deposition) of bonding material 540b with porous inorganic material results in the formation of porous hybrid inorganic-organic material.

The non-porous hybrid organic-inorganic material 530a (where not in contact with the porous material 550) and non-porous hybrid organic-inorganic material 540b are additionally surface modified with the bonding material 540a. As can be seen from FIG. 5, the modified surface 520 is in contact with the non-porous hybrid organic-inorganic material 530a, both of which are in contact with the bonding material 540b. The non-porous hybrid organic-inorganic material 530b is in contact with the porous material 550, which is also in contact with the non-porous hybrid organic-inorganic material 530a. The non-porous hybrid organic-inorganic material 530b and non-porous hybrid organic-inorganic material 530a are both in contact (have been surface modified) with the bonding material 540a. The non-porous hybrid organic-inorganic material 530b and 530a may also be in contact with both bonding material 540a and bonding material 540b.

In some embodiments, the bonding material 540b incorporated within the modified surface 520 and the non-porous hybrid organic-inorganic material 530a is the same as the bonding material 540a that is added after growth of the non-porous hybrid organic-inorganic material 530b. That need not be the case, however. In some embodiments, the bonding material 540b within the modified surface 520 and the non-porous hybrid organic-inorganic material 530a is different than the bonding material 540a that is added after growth of the non-porous hybrid organic-inorganic 530b (e.g., an end cap is supplied outside of hybrid material 530b, or a charge is added to create a charged surface).

In some embodiments, both the non-porous hybrid organic-inorganic material 530a and the non-porous hybrid organic-inorganic material 530b are the same material (i.e., chemically, structurally the same). That need not be the case, however. In some embodiments, the non-porous hybrid organic-inorganic material 530a is different than the non-porous hybrid organic-inorganic material 530b that is added after growth of the porous material 550. For example, non-porous hybrid organic-inorganic material 530a and non-porous hybrid organic-inorganic material 530b can be chemically distinct and/or can have different microstructures.

Figure 6:
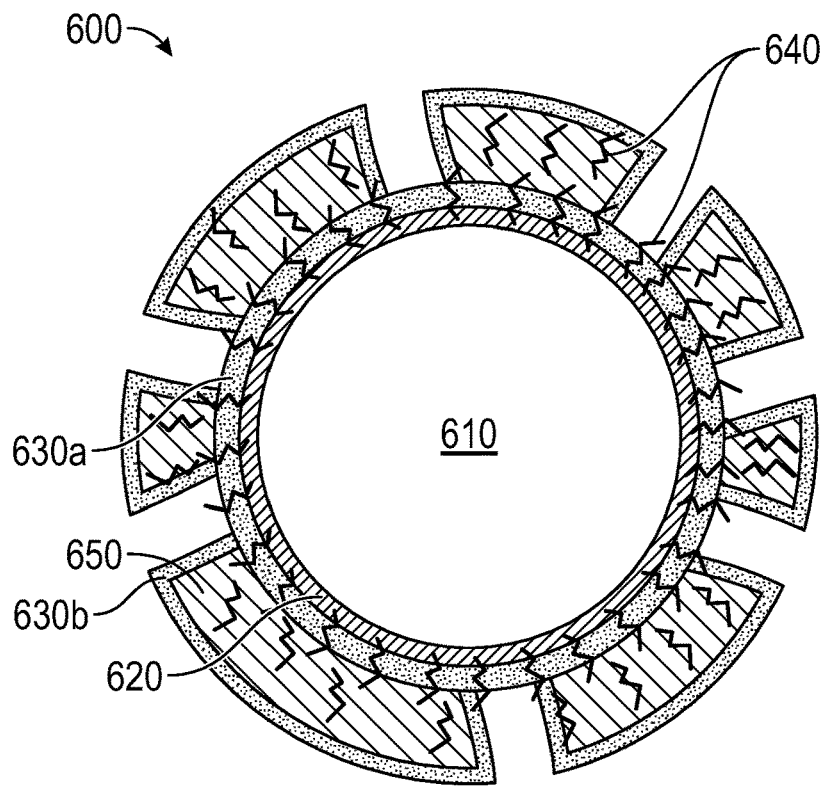
FIG. 6 a cross-sectional schematic illustration of a superficially porous composite particle, in accordance with another embodiment of the present disclosure.

Although FIG. 5 shows particle 500 with bonding material 540a added after growth of the porous material 550, this need not be the case. As shown in FIG. 6, in another embodiment, each of the modified surface 620, non-porous hybrid organic-inorganic material 630a, and porous material 650 is intrinsically modified with bonding material 640. That is, the bonding material 640 is incorporated in at least a portion of one or more of the modified surface 620, the non-porous hybrid organic-inorganic material 630a, and the porous material 650. It is noted that when bonding material 640 is intrinsically incorporated within a portion of a porous inorganic material, that modified portion is transformed into a porous hybrid inorganic-organic material (e.g., porous material 650).

As can be seen from FIG. 6, the modified surface 620 of the non-porous polymer core 610 is in contact with the non-porous hybrid organic-inorganic material 630a, which is also in contact with the porous material 650, all of which are in contact with the bonding material 640. In addition, non-porous hybrid organic-inorganic material 630b can also include (be intrinsically modified with) the bonding material 640. Although not shown, in some embodiments, the bonding material 640 is included with a varying composition (e.g., gradient) within one or more of the non-porous hybrid organic-inorganic non-porous material 630a, 660b, and the porous material 650.

And although not shown in FIG. 6, not all materials 630a, 630b, and 650 need to be intrinsically modified with bonding material 640. For example, porous material 650 need not be intrinsically modified. That is, it is possible to incorporate bonding material into one or more of modified surface 620, non-porous hybrid organic-inorganic material 630a, and non-porous hybrid organic-inorganic material 630b, without incorporating bonding material 640 into porous material 650. In that case, porous material 650 would not be intrinsically modified and in this embodiment would be a porous inorganic material.

In some embodiments, both the non-porous hybrid organic-inorganic material 630a and the non-porous hybrid organic-inorganic material 630b are the same material (i.e., chemically, structurally the same). That need not be the case, however. In some embodiments, the non-porous hybrid organic-inorganic material 630a is different than the non-porous hybrid organic-inorganic material 630b that is added after growth of the porous material 650. For example, non-porous hybrid organic-inorganic material 630a and non-porous hybrid organic-inorganic material 630b can be chemically distinct and/or can have different microstructures.

The bonding material may be functionalized (e.g., tailored or tuned) for particular chromatographic separations or modes (Slalom, HDC, IP-RPLC, WAX). In some cases, at least a portion of the bonding material is a silane. The bonding material may be hydrophobic, hydrophilic, positively and/or negatively charged, or a combination thereof. In some cases, at least a portion of the bonding material may be an ionizable silane. The bonding material may include, but is not limited to, alkyl groups (e.g., C1 to C20), polyethylene glycols, hydrophilic polymers based on acrylamide and (meth)acrylate, polar groups containing nitride, nitrile, hydroxyl, negatively and/or positively charged groups, amino, chloro, or alkoxysilanes, or combinations thereof.

In some embodiments, the bonding material may be incorporated into composite particle homogenously. The bonding material may be deposited in sync (i.e., intrinsically modified) and/or may be applied to an exterior surface (i.e., surface modified). The bonding material may be incorporated into the composite particle as a gradient, with the bonding material deposited after formation of a particular material (e.g., the non-porous hybrid organic-inorganic material) has started, but before deposition/formation of that particular region of the particle (e.g., 630a, 630b) has ended. In some embodiments, the non-porous hybrid organic-inorganic material may have a concentration or amount of bonding material that varies along a thickness of the material. In some cases, the bonding material may be incorporated into the modified surface (e.g., a silyl modified surface) as a silane-based bonding. (See, for example US Patent Publication US 2019/0322783 incorporated herein by reference.) The bonding material may be hydrophobic, hydrophilic, positively and/or negatively charged, or a combination thereof. In some cases, at least a portion of the bonding material may be an ionizable silane to form a functionalized surface.

As used herein the term "gradient" refers to the composition of the particles as viewed from the direction of the center of the particle to the particle surface. In a gradient material, the composition of the material is varied based on the order and concentration of monomers added in a predetermined pattern such that there is composition variance along the radius of the particle but without the formation of discrete shells of material. For example, the material(s) of the polymer particles may have a unique gradient composition across the radius from the particle nucleus to the outermost surface, wherein the composition gradient includes, but not limited to, hydrophobic/hydrophilic gradient, crosslinking ratio gradient, functional group gradient, charge ratio gradient, density gradient, or a combination thereof.

Chromatographic Devices.

In some aspects of the present disclosure, the composite particles described herein may be provided in a suitable chromatographic device. For this purpose, the composite particles described herein may be provided in conjunction with a suitable housing. The composite particles and the housing may be supplied independently, or the composite particles may be pre-packaged in the housing. Housings for use in accordance with the present disclosure commonly include a chamber for accepting and holding composite particles. In various embodiments, the housings may be provided with an inlet and an outlet leading to and from the chamber.

Suitable construction materials for the chromatographic housings include inorganic materials, for instance, metals such as stainless steel and ceramics such as glass, as well as synthetic polymeric materials such as polyethylene, polypropylene, polyether ether ketone (PEEK), and polytetrafluoroethylene, among others.

In certain embodiments, the chromatographic housings may include one or more filters which act to hold the composite particles in a housing. Exemplary filters may be, for example, in a form of a membrane, screen, frit or spherical porous filter.

In certain embodiments, the chromatographic device is a chromatographic column.

The present disclosure also provides for a kit comprising the composite particles, housings or devices as described herein and instructions for use. In one embodiment, the instructions are for use with a separation device, e.g., a chromatographic column.

Chromatographic Separations.

In some aspects of the present disclosure, the composite particles of the present disclosure can be used in a variety of chromatographic separation methods. As such, the chromatographic devices and chromatographic kits described herein can also be utilized for such methods. Examples of chromatographic separation methods in which the composite particles of the invention can be used include used in both high-pressure liquid chromatography (HPLC) and ultra-high pressure liquid chromatography (UHPLC) in different modes. Those modes include, but are not limited to, affinity separation, hydrophilic interaction chromatography (HILIC) separations, normal-phase separations, reversed-phase separations, chiral separations, supercritical fluid chromatography SFC separations, perfusive separations, size-exclusion chromatography (SEC) separations, ion exchange separations, or multimode separations.

The composite particles, devices and kits of the present disclosure may be used for chromatographic separations of small molecules, carbohydrates, antibodies, whole proteins, peptides, and/or DNA, among other species.

Such chromatographic separations may comprise loading a sample onto composite particles in accordance with the present disclosure and eluting adsorbed species from the composite particles with a mobile phase.

Such chromatographic separations may be performed in conjunction with a variety of aqueous and/or organic mobile phases (i.e., in mobile phases that contain water, an organic solvent, or a combination of water and organic solvent) and in conjunction with a variety of mobile phase gradients, including solvent species gradients, temperature gradients, pH gradients, salt concentration gradients, or gradients of other parameters.

The following examples are provided to illustrate how to make composite particles and their components in accordance with the present technology. The examples are provided for illustrative purposes only and should not be considered to be limiting. When an amount, concentration, or other value or parameter is given as either a range, preferred range, or a list of upper preferable values and lower preferable values, this is to be understood as specifically disclosing all ranges formed from any pair of any upper range limit or preferred value and any lower range limit or preferred value, regardless of whether ranges are separately disclosed. Where a range of numerical values is recited herein, unless otherwise stated, the range is intended to include the endpoints thereof, and all integers and fractions within the range. It is not intended that the scope of the present technology be limited to the specific values recited when defining a range.

Example 1. Non-Porous Poly(DVB80) Particulate Core

In this example, an exemplary non-porous core is manufactured. Other processes and other materials can be utilized for making the non-porous polymer core of the composite particles of the present technology.

The inhibitor in divinylbenzene (80%, technical grade) used in the particle synthesis was removed by passing the monomer through an alumina cartridge.

Primary particle synthesis: In this particle synthesis experiment (sample 1A in Table 1 below), 65.1 grams of PVP-40, 8.9 grams of Triton N-57, 2452.6 grams of reagent alcohol (905 ethanol, 5% methanol and 5% isopropanol) and 153.3 grams g of p-xylene were charged into a 4 L cylinder flask reactor equipped with mechanical agitation, condenser and thermocouple. The mixture was mixed with agitation at 200 RPM and the dissolved oxygen in the solution was removed by sub-surface purging with nitrogen. After dissolved oxygen is below 1 ppm, 2.1 grams of azobisisobutyronitrile and 105 grams of divinylbenzene was charged into the reaction. The reaction temperature was raised to 70° C. and held at this temperature for 20 hrs. Primary core growth: When 20 hours of reaction time was reached, the temperature was maintained at 70° C. and 1.8 grams of azobisisobutyronitrile was added. Subsequently, a solution of 67.6 grams of divinylbenzene and 20.3 grams of PVP-40 in 202.7 grams of reagent alcohol was metered in via a pump at a constant flow rate over 120 minutes. The reaction was continued at 70° C. for at least 12 hours. After reaction, the particles were separated from the reaction slurry by filtration, followed by washing sequentially with methanol, tetrahydrofuran (THF) and acetone. The final product was dried in vacuum oven at 45° C. overnight. Approximately 147 grams of 1.95 µm particles were obtained.

To test the effect of adjusting the amount of PVP-40 in the beginning of the reaction, three different amounts (65.1 g—sample 1A; 48.9 g—sample 1B; and 109.2g—sample 1C) were evaluated. Table 1 below provides the results, which indicate that particle size is inversely related to the amount of PVP-40.

TABLE 1

| Sample | PVP-40, g | Particle size, µm | Specific surface area, m²/g | Pore volume, cc/g |
|---|---|---|---|---|
| 1A | 65.1 | 1.95 | 36.0 | 0.04 |
| 1B | 48.9 | 2.22 | 30.8 | 0.03 |
| 1C | 109.2 | 1.27 | 38.5 | 0.04 |

Example 2. Non-Porous Poly(DVB80-Co-Styrene) Particulate Core

In this example, an exemplary non-porous core is manufactured which includes a polymer core including two different polymers. Other processes and other materials can be utilized for making the non-porous polymer core of the composite particles of the present technology.

The inhibitor in both divinylbenzene (80%, technical grade) and styrene used in the particle synthesis was removed by passing the monomers through an alumina cartridge.

Primary particle synthesis: In this particle synthesis experiment (sample 2A) 78.2 grams of PVP-40, 8.9 grams of Triton N-57, 2452.6 grams of reagent alcohol (905 ethanol, 5% methanol and 5% isopropanol) and 153.3 grams g of p-xylene were charged into a 4 L cylinder flask reactor equipped with mechanical agitation, condenser and thermocouple. The mixture was mixed with agitation at 200 RPM and the dissolved oxygen in the solution was removed by sub-surface purging with nitrogen. After dissolved oxygen is below 1 ppm, 2.1 grams of azobisisobutyronitrile, 42 grams of divinylbenzene (80%, technical grade) and 63.0 grams of styrene were charged into the reaction. The reaction temperature was raised to 70° C. and held at this temperature for 20 hrs.

Primary core growth: When 20 hours of reaction time was reached, the temperature was maintained at 70° C. and 1.8 grams of azobisisobutyronitrile was added. Subsequently, a solution of 67.6 grams of divinylbenzene and 19.2 grams of PVP-40 in 192.0 grams of reagent alcohol was metered in via a pump at a constant flow rate over 120 minutes. The reaction was continued at 70° C. for at least 12 hours. After reaction, the particles were separated from the reaction slurry by filtration, followed by washing sequentially with methanol, tetrahydrofuran (THF) and acetone. The final product was dried in vacuum oven at 45° C. overnight. Approximately 135 grams of 2.2 µm particles were obtained.

Below, in Table 2, samples 2A to 2C describe the synthesis of poly(DVB80-co-styrene) particles with different DVB80 and styrene compositions by adjusting the amount of DVB 80 and styrene charged in the primary core synthesis step of the core growth step.

TABLE 2

| Sample | Primary core synthesis DVB80, g | Primary core synthesis Styrene, g | Primary core growth DVB80, g | Primary core growth Styrene, g | Particle size, µm | Specific surface area m²/g | Pore volume cc/g |
|---|---|---|---|---|---|---|---|
| 2A | 42.0 | 63.0 | 67.6 | 0.0 | 2.07 | 8.2 | 0.010 |
| 2B | 63.0 | 42.0 | 38.4 | 25.6 | 1.72 | 2.1 | 0.005 |
| 2C | 105.0 | 0.0 | 30.5 | 20.3 | 1.63 | 6.3 | 0.008 |
| 2D | 57.8 | 47.2 | 63.7 | 0.0 | 2.32 | 18.4 | 0.02 |

Example 3. Larger Particulate Core Made from Another Smaller Core

In this example, an exemplary non-porous core, which includes a core made in two stages is manufactured. Other processes and other materials can be utilized for making the non-porous polymer core of the composite particles of the present technology.

120 grams of particle (particle size, 2.32 µm) made by the method described in sample 2D, were re-dispersed in a solution containing 37.0 grams of PVP-40, 4.5 grams g of Triton™ N-57, 100.0 grams of p-xylene and 1234.0 grams of reagent alcohol (90% ethanol, ~5% methanol and ~5% isopropanol), then charged into a 4 liter kettle reactor equipped with mechanical agitation, condenser reactor and thermocouple. The slurry was mixed at 200 RPM and purged with nitrogen via subsurface to obtain a dissolved oxygen below 1 ppm. Once the dissolved oxygen in the solution is less than 1 ppm, the nitrogen subsurface sparging was changed to blanket sparging, the agitation speed was adjusted to 75 RPM and then the reaction temperature was raised to 70° C. When the reaction temperature reached 70° C., 4.8 grams of divinylbenzene (80%, inhibitor was removed with aluminum oxide) and 3.0 grams of AIBN were added. 15 minutes later, a solution containing 139.5 grams of divinylbenzene (80%, inhibitor was removed with aluminum oxide), 105.6 grams of PVP-40 and 1345.7 grams of reagent alcohol was added via a pump at a constant rate over 2 hours. After addition, the reaction was held for 20 hours at 70° C. After reaction, the particles were separated from the reaction slurry by filtration. The particles were washed with methanol, followed with tetrahydrofuran (THF), and lastly with acetone. The final product was dried in vacuum oven at 45° C. overnight. 250 grams of monodisperse 3.0 µm particles were obtained.

Example 4. Core Surface Primed with Silane Functionality

In this example, an exemplary primed, non-porous core is manufactured. Other processes and other materials can be utilized for making the primed, non-porous polymer core of the composite particles of the present technology.

The inhibitor in both divinylbenzene (80%, technical grade) and styryl ethyltrimethoxysilane was removed by passing through an alumina cartridge. The reagent alcohol used in the reaction contained 90% ethanol, ~5% methanol and ~5% isopropanol. In this particle synthesis experiment (see sample 4A in Table 3 below), 44.7 grams of PVP-40, 165.2 grams g of p-xylene were charged into a 4 L round bottom flask reactor equipped with mechanical agitation, condenser reactor and thermocouple. A slurry of 145.0 grams of particles (sample 1A, from example 1) in 1490.7 grams of reagent alcohol was added. The mixture was mixed at 200 RPM for 24 hours. Then the reaction slurry was purged with nitrogen via sub-surface to obtain a dissolved oxygen below 1 ppm. Once the dissolved oxygen in the solution is less than 1 ppm, the reaction mixture was heated to 70° C. and the agitation speed was adjusted to 75 RPM. Then, 2.9 grams of divinylbenzene and 2.5 grams of 2,2'-Azobis(2-methylpropionitrile) (AIBN) were added. After 15 minutes of mixing, a solution containing 14.5 grams of styryl ethyltrimethoxysilane, 1.5 grams of divinylbenzene and 13.9 grams of PVP-40 in 464.0 grams of reagent alcohol was added at a constant flow rate over 2 hours. After the reaction was held at 70° C. for a total of 20 hrs, the reaction was cooled to below 40° C. and the produced particles were separated from the reaction slurry by filtration. The particles were washed with methanol, followed with tetrahydrofuran (THF), and lastly with acetone. The final product was dried in vacuum oven at 45° C. overnight. 149.0 grams of primed particles were obtained.

Table 3 provides the synthesis of primed particles with different surface morphology and primer layer thickness by adjusting the amount of primer monomer use and the amount of crosslinker DVB80 used in numerous different samples.

agitation, a condenser, a reactor, and a thermocouple. A slurry of 50.0 grams of particle made in example 3 in 514.0 grams of reagent alcohol was added. The mixture was mixed at 200 RPM for 24 hours. Then the reaction slurry was purged with nitrogen via sub-surface to obtain a dissolved oxygen below 1 ppm. Once the dissolved oxygen in the solution is less than 1 ppm, the reaction mixture was heated to 70° C. and the agitation speed was adjusted to 75 RPM. Then, 1.8 grams of divinylbenzene and 0.9 grams of 2,2'-Azobis(2-methylpropionitrile) (AIBN) were added. After 15 minutes of mixing, a solution containing 9.0 grams of N-vinyl pyrrolidone, 0.9 grams of divinylbenzene and 3.6 grams of PVP-40 in 120.0 grams of reagent alcohol was added at a constant flow rate over 2 hours. After the reaction was held at 70° C. for a total of 20 hrs, the reaction was cooled to below 40° C. and the produced particles were separated from the reaction slurry by filtration. The particles were washed with methanol, followed with tetrahydrofuran (THF), and lastly with acetone. The final product was dried in vacuum oven at 45° C. overnight. 54.0 grams of primed particles were obtained.

Samples 5A to 5E, shown below, describe the synthesis of primed particles with different surface functionalities. In each sample, the primer monomer was replaced in the formulation of the primed, non-porous polymer core. While the experiment described above utilizes sample 5A, other experiments were performed utilizing samples 5B to 5E.

TABLE 3

| Sample | Surface area m²/g | Pore volume cc/g | Core slurry, g | | | | | | Primer solution, g | | |
|---|---|---|---|---|---|---|---|---|---|---|---|
| | | | Core particle | Reagent alcohol | p-Xylene | PVP-40 | AIBN | DVB80 | DVB80 | Styryl ethyltrimethoxylsilane | PVP-40 | Reagent alcohol |
| 4A | 4.8 | 0.015 | 145.0 | 1490.7 | 165.2 | 44.7 | 2.5 | 2.9 | 1.5 | 14.5 | 13.9 | 464.0 |
| 4B | 4.3 | 0.013 | 135.0 | 1387.9 | 153.8 | 41.6 | 2.4 | 2.7 | 1.4 | 13.5 | 13.0 | 432.0 |
| 4C | 1.6 | 0.005 | 145.0 | 1490.7 | 165.2 | 44.7 | 2.5 | 2.9 | 1.5 | 14.5 | 13.9 | 464.0 |
| 4D | 4.6 | 0.014 | 125.0 | 1285.0 | 142.4 | 38.6 | 2.2 | 2.3 | 1.2 | 11.6 | 4.2 | 140.9 |
| 4E | 4.6 | 0.014 | 138.0 | 1387.9 | 153.8 | 41.6 | 2.4 | 2.7 | 1.4 | 13.5 | 13.0 | 432.0 |
| 4F | 6.1 | 0.019 | 130.0 | 1336.4 | 148.1 | 40.1 | 2.3 | 2.6 | 1.3 | 13.0 | 12.5 | 416.0 |
| 4G | 4.2 | 0.014 | 50.0 | 514.0 | 57.0 | 15.4 | 0.9 | 0.9 | 0.5 | 4.7 | 1.7 | 56.4 |
| 4H | 5.1 | 0.015 | 50.0 | 514.0 | 57.0 | 15.4 | 0.9 | 1.8 | 0.9 | 9.0 | 3.6 | 120.0 |
| 4I | 11.6 | 0.039 | 50.0 | 528.8 | 58.6 | 15.9 | 0.9 | 2.5 | 1.3 | 12.7 | 3.0 | 101.3 |

Example 5. Core Surface Primed with Other Functionality

In this example, an exemplary primed, non-porous core is manufactured having various functionality. Other processes and other materials can be utilized for making the primed, non-porous polymer core of the composite particles of the present technology.

Here, referring to sample 5A (shown below), the primer monomer of the primed, non-porous polymer core was replaced. Specifically, the reagent alcohol used in the reaction contains 90% ethanol, ~5% methanol and ~5% isopropanol. In this particle synthesis experiment, 15.4 grams of PVP-40 and 57.0 grams of p-xylene were charged into a 1 L round bottom flask reactor equipped with mechanical

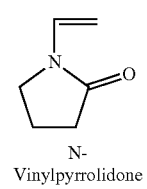

5A

N-Vinylpyrrolidone

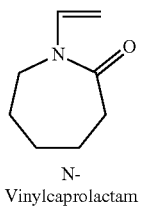

N-Vinylcaprolactam

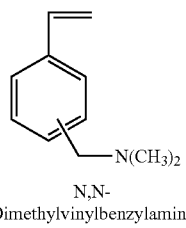

N,N-Dimethylvinylbenzylamine

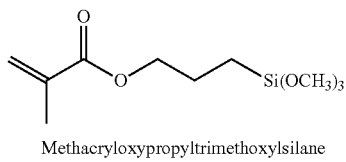

Methacryloxypropyltrimethoxylsilane

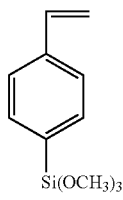

p-Styryltrimethoxylsilane

Example 6. Non-Porous Hybrid Coating on Trimethoxylsilane Primed Core

In this example, an exemplary primed, non-porous core with a hybrid coating is manufactured to form a composite particle in accordance with the present technology. Other processes and other materials can be utilized for making the primed, non-porous polymer core with a hybrid coating of the composite particles of the present technology.

In this particle synthesis experiment (i.e., to for sample 6A), a 5 L round bottom flask reactor equipped with mechanical agitation, a condenser, reactor, and thermocouple, was set up in a sonication bath capable of heating (490 watts). 140.0 grams of silane primed core (sample 4A) was re-dispersed in 1120.0 grams of 200 proof ethanol and then charged into reactor. 1120.0 grams of toluene and 26.9 grams of Pluronic F127 and 77.1 grams of ammonium hydroxide (28-30% aqueous solution) were added to the slurry of the reactor. The temperature of the sonication bath was raised to 35° C. and start sonication. The sonication was maintained through the entire coating process. When the sonication bath temperature reached 35° C., a solution containing 98.2 grams of tetraethyl orthosilicate (TEOS), 41.8 grams of 1,2-bis(triethoxysilyl), ethane (BTEE), 3.5 grams of Pluronic F127 in a mixed solvent of 70.0 grams of ethanol (200 proof), and 70.0 grams of toluene, was metered into the reactor at a constant flow rate over 6 hours. After the addition, the reaction was held at 35° C. for 24 hours. The coated were isolated by filtration and washed with methanol for 6 times. The final product was dried in vacuum oven at 70° C. overnight. 174.0 grams of non-porous BEH coated particles (i.e., sample 4A particles coated with non-porous BEH material) were obtained.

Table 4 below provides the synthesis of non-porous hybrid coated particle with different coating thickness and surface morphology by adjusting the amount of TEOS, BTEE and the use or not use of surfactant (samples 6A-6H).

TABLE 4

| Example 6 | Surface area $m^2/g$ | Pore volume cc/g | Particle szie μm | Coating thickness nm | Primed core particle ID | Charge, g | Surfactant | Coating monomer TEOS, g | BTEE, g |
|---|---|---|---|---|---|---|---|---|---|
| 6A | 4.8 | 0.011 | 2.05 | 48.5 | example 4A | 140 | Pluronic F127 | 98.2 | 41.8 |
| 6B | | | | 190.0 | example 4F | 130 | No surfactant | 284.2 | 120.8 |
| 6C | | | | 67.0 | example 4E | 130 | No surfactant | 134.5 | 57.2 |
| 6D | 4.2 | 0.011 | 2.23 | 50.0 | example 4D | 40 | Pluronic F127 | 28.1 | 11.9 |
| 6E | 4.4 | 0.010 | 2.25 | 51.0 | example 4B | 90 | Pluronic F127 | 63.2 | 26.9 |
| 6F | 5.3 | 0.012 | 1.91 | 31.0 | example 4C | 90 | Pluronic F127 | 63.2 | 26.9 |
| 6G | 4.1 | 0.029 | | 175.0 | | 3 | PE-block-PEO, Mw = 1400 | 8.0 | 2.0 |
| 6H | 5.7 | 0.007 | | 178.0 | | 3 | Triton X-100 | 8.0 | 2.0 |

Example 7. Non-Porous Hybrid Coating on Pyrrolidone Primed Core

In this example, an exemplary primed (primed with pyrrolidone), non-porous core with a hybrid coating is manufactured. Other processes and other materials can be utilized for making the primed, non-porous polymer core with a hybrid coating of the composite particles of the present technology.

A 5 L round bottom flask reactor equipped with mechanical agitation, a condenser, reactor, and thermocouple were set up in a sonication bath capable of heating (490 watts). 14.0 grams of pyrrolidone primed core (sample 5A) was re-dispersed in 112.0 grams of 200 proof ethanol and then charged into reactor. 112.0 grams of toluene, 2.7 grams of Pluronic F127 and 7.7 grams of ammonium hydroxide (28-30% aqueous solution) were added to the slurry of the reactor. The sonication bath temperature was raised to 35° C. for sonication. The sonication was maintained through the entire coating process. When the sonication bath temperature reached 35° C., a solution containing 9.8 grams of tetraethyl orthosilicate (TEOS), 4.2 grams of 1,2-bis(triethoxysilyl) ethane (BTEE), 0.4 grams of Pluronic F127 in a mixed solvent of 7.0 grams of ethanol (200 proof), and 7.0 grams of toluene was metered into the reactor at a constant flow rate over 6 hours. After the addition, the reaction was held at 35° C. for 24 hours. The coated particles were isolated by filtration and washed with methanol for 6 times. The final product was dried in vacuum oven at 70° C. overnight. 16.0 grams of non-porous BEH coated particles were obtained.

Example 8. Non-Porous Material Fabrication on Non-Porous Hybrid Coated Core

In this example, a non-porous core with a non-porous hybrid coating is manufactured. Other processes and other materials can be utilized for making the primed, non-porous polymer core with a non-porous coating of the composite particles of the present technology.

5.0 grams of non-porous hybrid coated core (example 6F, 1.91 inn) was dispersed in 383.3 grams of ethanol and 188.5 grams of water with 11.0 grams of Pluronic P123 in a 1 L round-bottom flask equipped with mechanical agitation, condenser and thermocouple. The temperature of the reaction slurry was raised to 46° C. and agitation speed was adjusted to 150 RPM. Subsequently, two emulsions were prepared. Emulsion A contains 14.03 grams of tetraethyl orthosilicate (TEOS) and 5.97 grams of 1,2-Bis(triethoxysilyl)ethane (BTEE) emulsified in a mixed solvent of 36.9 grams of ethanol and 62.8 grams of water with 2.57 grams of Pluronic P123. Emulsion B contains 21.3 grams of N,N-Dimethylhexadecylamine emulsified in a mixed solvent of 59.4 grams of ethanol and 29.2 grams of water with 1.74 grams of Pluronic P123. Emulsion A and Emulsion B were separately metered via two pumps at a constant flow rate over 6 hours and the two streams were combined before flowing to the reactor. The reaction was maintained at 46° C. for 24 hours. After reaction, the particles were isolated by filtration and washed with methanol for three times. The particles were further aged at 55° C. for 24 hours in a solution containing 135.0 grams of ethanol, 122.0 grams of water and 30.0 grams ammonium hydroxide (28-30%, wt). After dried in vacuum oven at 45° C. overnight, 9.9 grams of 2.6 inn aged composite particles were obtained. The particles were hydrothermally autoclaved in a pH9.8 buffer at 155° C. for 20 hours.

Example 9. Porous Silica Growth

In this example, a non-porous core with a porous silica coating is manufactured. Other processes and other materials can be utilized for making the non-porous polymer core having a non-porous hybrid layer with a porous silica coating of the composite particles of the present technology.

5.0 grams of non-porous hybrid coated core (example 6A, 2.05 μm) are dispersed in 306.8 grams of ethanol and 150.8 grams of water with 9.0 grams of Pluronic P123 in a 1 L round-bottom flask equipped with mechanical agitation, condenser and thermocouple. The temperature of the reaction slurry is raised to 46° C. and agitation speed is adjusted to 150 RPM. A solution is prepared by dissolving 5.7 grams of Pluronic P123 in a binary solvent of 113.6 grams of ethanol and 100.5 grams of water, followed by addition of an organic mixture containing 12.1 grams of N,N-Dimethylhexadecylamine, 17.54 grams of tetraethyl orthosilicate (TEOS), and 36.0 grams of toluene. The solution is emulsified by sonication and the obtained emulsion is mixed at ambient temperature for 60 minutes. After 60 minutes mixing, the emulsion was added to the reaction and the reaction was continued at 46° C. for 24 hours. After reaction, the particles are isolated by filtration and washed with methanol for three times. The particles are further aged at 55° C. for 24 hours in a solution containing 135.0 grams of ethanol, 122.0 grams of water and 30.0 grams ammonium hydroxide (28-30%, wt). After aging, the particles underwent surfactant extraction by sequential treatments in 90/10, ethanol/2N HCl and later refluxing methanol. The dried particles are next hydrothermally treated in 0.3 M pH 5.8 ammonium acetate buffer at 100° C. to increase pore diameter. The porous silica shells were next made ready for hybrid coating and/or dense bonding by refluxing in 1 M HCl for 16 hours, followed copious water washes, 3 acetone washes, and vacuum drying at 70 C.

Example 10. Porous Silica Growth Followed by Silica Surface Modification

In this example, a non-porous core (having a layer of non-porous hybrid organic-inorganic material) with a surface modified porous silica coating is manufactured. Other processes and other materials can be utilized for making the non-porous polymer core with a surface modified porous silica coating of the composite particles of the present technology.

A 50 gram portion of non-porous hybrid coated core (example 6A, 2.05 μm) is dispersed in 3,608 grams of ethanol and 1,508 grams of water with 90 grams of Pluronic P123 in a 10 L round-bottom flask equipped with mechanical agitation, condenser and thermocouple. The temperature of the reaction slurry was raised to 46° C. and agitation speed was adjusted to 150 RPM. A solution is prepared by dissolving 57 grams of Pluronic P123 in a binary solvent of 1,136 grams of ethanol and 1,005 grams of water, followed by addition of an organic mixture containing 121 grams of N,N-Dimethylhexadecylamine, 175.4 grams of tetraethyl orthosilicate (TEOS), and 360 grams of toluene. The solution is emulsified by sonication and the obtained emulsion was mixed at ambient temperature for 60 minutes. After 60 minutes mixing, the emulsion is added to the reaction and the reaction was continued at 46° C. for 24 hours. After reaction, the particles are isolated by filtration and washed with methanol for three times. The particles were further aged at 55° C. for 24 hours in a solution containing 1,350 grams of ethanol, 1,220 grams of water and 300 grams ammonium hydroxide (28-30%, wt). After aging, the particles underwent surfactant extraction by sequential treatments in 90/10, ethanol/2N HCl and later refluxing methanol. The dried particles are next hydrothermally treated in 0.3 M pH 5.8 ammonium acetate buffer at 100° C. to increase pore diameter. The porous silica shells are next made ready for hybrid coating and/or dense bonding by refluxing in 1 M HCl for 16 hours, followed copious water washes, 3 acetone washes, and vacuum drying at 70° C. Next, ten-gram portions of the novel polymer core-porous silica particles are further treated to increase the high pH stability of the porous silica coating by techniques known and previously disclosed in the art. The resultant novel composite particles have a porous coating which is suitable for use at elevated pH and a chromatographically inert composite core, which does not dissolve at high pH.

The surface of these novel particles can be further modified (e.g., modified with C18, C8, C4, etc.) to yield bonded phases by techniques which are well known to those skilled in the art.

Example 11. Layer by Layer Porous Silica Growth Followed by Silica Surface Modification In this example, a non-porous core (core being a polymer center with surrounding hybrid organic-inorganic material) with a surface modified porous silica coating and silica layers is manufactured. Other processes and other materials can be utilized for making the non-porous polymer core with a surface modified porous silica coating and silica layers of the composite particles of the present technology.

A 50 gram portion of non-porous hybrid coated core (example 6A, 2.05 μm) is subjected to a Layer By Layer porous silica growth method described by Tanaka and McCalley in Anal. Chem. 2016, 88,1, 279-298, herein incorporated by reference. The freshly made particles are aged, dried and surfactant extracted using standard techniques. The dried particles are next hydrothermally treated in 0.3 M pH 5.8 ammonium acetate buffer at 100° C. to increase pore diameter. The porous silica shells are next made ready for hybrid coating and/or dense bonding by refluxing in 1 M HCl for 16 hours, followed copious water washes, 3 acetone washes, and vacuum drying at 70° C. Next, ten-gram portions of these novel polymer core-porous silica particles are further treated to increase the high pH stability of the porous silica coating by techniques known and previously disclosed in the art. The resultant novel composite particles have a porous coating which is suitable for use at elevated pH and a chromatographically inert composite core, which does not dissolve at high pH. Some representative silica coating modification techniques, which serve to increase high pH resistance, are listed in the following table (Table 5), which is not intended to be limiting in any way. These processes can be used to modify the silica coatings.

TABLE 5

| Type of Modification | Reference | Description |
|---|---|---|
| Organo-silica coating | US2019/0091657; US2019/0015815 | Organo-silica PEOS used to coat porous silica surface organo-silica hybrid layer(s) |
| Silica Based Material | U.S. Pat. No. 9,308,520 B2 Example 12 | 100% BTEE Coating on porous silica surface |
| pH stable chromatographic media using templated multilayer organic/inorganic grafting | U.S. Pat. No. 7,563,367 Example 4 | 100% BTEE coating on porous silica surface by multiple sequential surface bondings with bistris(dimethylamino)silylethane |

The silica coating modification processes of Table 5 are herein incorporated by reference in their entirety and can be used to modify the surface of the composite particles disclosed herein.

The invention claimed is:

1. A composite particle comprising:
   a non-porous polymer particle core having a modified surface;
   a non-porous hybrid organic-inorganic material in contact with the modified surface; and
   a porous inorganic material in contact with the non-porous hybrid organic-inorganic material.

2. The particle of claim 1, wherein the non-porous polymer particle core is made from a radical polymerizable monomer or monomers.

3. The particle of claim 2, wherein the non-porous polymer particle core is made from styrene, divinylbenzene, methacrylate, or acrylonitrile.

4. The particle of claim 1, wherein the non-porous polymer particle core is made from a monomer or monomers that can be polymerized by ring opening polymerization.

5. The particle of claim 4, wherein the monomers are epoxides.

6. The particle of claim 1, wherein at least a portion of the modified surface of the non-porous polymer particle core comprises at least a functional group covalently bonded to the non-porous hybrid organic-inorganic material to form a functionalized surface.

7. The particle of claim 6, wherein the functional group is at least one of organosilane, organotitanium, organozirconium characterized by C—Si, C—Ti and C—Zr bond.

8. The particle of claim 1, wherein at least a portion of the modified surface of the non-porous polymer particle core comprises at least a functional group electrostatically interacting with the non-porous hybrid organic-inorganic material to form a functionalized surface.

9. The particle of claim 1, wherein the non-porous hybrid organic-inorganic material has a thickness in the range of about 10 nm to about 200 nm.

10. The particle of claim 1, wherein the non-porous hybrid organic-inorganic material has a pore volume less than 0.1 cc/g.

11. The particle of claim 1, wherein the non-porous hybrid organic-inorganic material comprises at least one of silica, alumina, titanium, cerium, zirconium, zirconium oxide, or a ceramic material.

12. The particle of claim 1, wherein the non-porous hybrid organic-inorganic material comprises a silicon-based hybrid organic-inorganic material.

13. A composite particle comprising:
- a non-porous polymer particle core having a modified surface;
- a non-porous hybrid organic-inorganic material in contact with the modified surface, the non-porous hybrid organic-inorganic material deposited on outer most surface of a porous inorganic material to form a non-porous hybrid organic-inorganic barrier layer on the porous inorganic material on an exterior of the composite particle.

14. The composite particle of claim 13, further comprising a bonding material.

15. The composite particle of claim 14, wherein the bonding material is in contact with at least a portion of the non-porous hybrid organic-inorganic material.

16. The composite particle of claim 13, further comprising a bonding material in contact with the non-porous hybrid organic-inorganic barrier layer.

17. The composite particle of claim 13, wherein the non-porous polymer particle core is made from styrene, divinylbenzene, methacrylate, or acrylonitrile.

18. The composite particle of claim 17, wherein the modified surface is a silyl modified surface.

19. The composite particle of claim 13, wherein the porous inorganic material comprises silica.

20. The composite particle of claim 13, wherein the non-porous hybrid organic-inorganic material comprises a silicon-based hybrid organic-inorganic material.

* * * * *